United States Patent [19]

Shimizu et al.

[11] Patent Number: 5,780,562
[45] Date of Patent: *Jul. 14, 1998

[54] OLEFIN POLYMERIZATION CATALYST AND POLYOLEFIN

[75] Inventors: Hiroyuki Shimizu; Akira Sano, both of Tokyo; Kazuo Matsuura, Yokohama; Yuuji Washio, Niigata-ken, all of Japan

[73] Assignees: Nippon Oil Co., Ltd.; Mizusawa Industrial, both of Tokyo, Japan

[*] Notice: The term of this patent shall not extend beyond the expiration date of Pat. No. 5,604,170.

[21] Appl. No.: 517,336

[22] Filed: Aug. 21, 1995

[30] Foreign Application Priority Data

Aug. 23, 1994 [JP] Japan .................................. 6-231972

[51] Int. Cl.$^6$ .................................................. C08F 4/645
[52] U.S. Cl. .................... 526/129; 526/119; 526/124.5; 526/943; 502/108; 502/111; 502/114; 502/120; 502/132; 502/117
[58] Field of Search ........................... 502/120, 108, 502/111, 114, 132; 526/129, 124.5, 119

[56] References Cited

U.S. PATENT DOCUMENTS

| | | | |
|---|---|---|---|
| 4,849,390 | 7/1989 | Sano et al. | 502/113 |
| 5,189,000 | 2/1993 | Masi et al. | 502/113 |
| 5,514,634 | 5/1996 | Hagerty et al. | 502/125 |
| 5,529,965 | 6/1996 | Chang | 502/110 |
| 5,531,071 | 7/1996 | Kataoka et al. | 526/128 |
| 5,604,170 | 2/1997 | Sano et al. | 502/115 |

*Primary Examiner*—Mark Nagumo
*Attorney, Agent, or Firm*—Dilworth & Barrese

[57] ABSTRACT

A novel olefin polymerization catalyst is obtained by contacting the following components (1) to (5) with one another: (1) a compound represented by the general formula $Me^1R^1_p(OR^2)_qX^1_{4-p-q}$, (2) a compound represented by the general formula $Me^2R^3_m(OR^4)_nX^2_{z-m-n}$, (3) an organocyclic compound having conjugated double bonds; (4) a modified organoaluminum compound having Al—O—Al bond(s); and (5) a silicon oxide and/or an aluminum oxide both having characteristic average particle diameter, specific surface area, volume of pores ranging in pore radius from 18 to 1,000 Angstroms, apparent specific gravity not lower than 0.32, and proportion of 50 μm or smaller particles.

12 Claims, No Drawings

5,780,562

1

OLEFIN POLYMERIZATION CATALYST AND POLYOLEFIN

BACKGROUND OF THE INVENTION

The present invention relates to a novel olefin polymerization catalyst and a polyolefin preparing process using the same. More particularly, the present invention is concerned with an olefin polymerization catalyst capable of remarkably increasing the polymer yield per solids and the polymer yield per transition metal, thereby permitting omission of the step for removing the residual catalyst from the polymer, superior in fluidity with few agglomerates, capable of affording a polyolefin having good particle properties such as, for example, high bulk density, large average particle diameter and reduced proportion of fine particles, and further capable of affording an olefin copolymer of a narrow composition distribution.

In preparing polyolefins, particularly ethylene polymers or ethylene/α-olefin copolymers, it is well known to use a catalyst comprising a zirconium compound (typically a metallocene compound) and an aluminoxane, as described in JP58-19309A. This known technique is advantageous in that ethylene copolymers can be produced in high yields, but is disadvantageous in that the copolymers produced are narrow in both molecular weight distribution and composition distribution and are low in molecular weight.

If attention is paid to only the point of increasing the molecular weight of the resulting polymer, this can be attained to some extent by selecting a suitable transition metal compound of the metallocene as one component of the catalyst. For example, in order to increase the molecular weight of the resulting polymer, JP63-234005A proposes the use of a transition metal compound having a 2-, 3- and 4-substituted cyclopentadienyl group, and JP2-22307A proposes the use of a hafnium compound having a ligand combined with at least two, crosslinked, conjugated cycloalkadienyl groups.

As to such catalyst components, however, their synthesis route and operations are complicated, and in the case of using hafnium as a transition metal, the yield of the resulting polymer (yield per catalyst) becomes lower. In many cases, moreover, the above conventional catalysts are soluble in the reaction system, and if they are used in slurry polymerization or vapor-phase polymerization, there arises the problem that the resulting polymer is extremely low in bulk density and inferior in particle properties.

The present inventors have previously proposed a method of supporting a catalyst component containing a zirconium compound, a titanium compound or a hafnium compound as an essential constituent on an inorganic carrier and/or a particulate carrier (JP5-132518A).

It is an object of the present invention to solve the above-mentioned problems of the prior art.

It is another object of the present invention to provide a solid catalyst to produce a polyolefin having a high molecular weight, a wide molecular weight distribution, a narrow composition distribution and excellent particle properties, in high yield.

SUMMARY OF THE INVENTION

The present invention, in the first aspect thereof, resides in a solid catalyst for use in the preparation of polyolefins, characterized in that said solid catalyst is obtained by contacting the following constituents (1) to (5) with one another:

2

(1) a compound represented by the general formula $Me^1R^1_p(OR^2)_qX^1_{4-p-q}$, where $Me^1$ is Zr, Ti or Hf, $R^1$ and $R^2$ are each independently a hydrocarbon group having 1 to 24 carbon atoms, $X^1$ is a halogen atom, p and q are each an integer falling under the ranges of $0 \leq p \leq 4$ and $0 \leq q \leq 4$, provided $0 \leq p+q \leq 4$;

(2) a compound represented by the general formula $Me^2R^3_m(OR^4)_nX^2_{z-m-n}$, where $Me^2$ is a Group I–III element of the Periodic Table, $R^3$ and $R^4$ are each independently a hydrocarbon group having 1 to 24 carbon atoms, $x^2$ is a halogen atom or a hydrogen atom, provided when $X^2$ is a hydrogen atom, $Me^2$ is a Group III element of the Periodic Table, z is the valence of $Me^2$, m and n are each an integer falling under the ranges of $0 \leq m \leq z$, and $0 \leq n \leq z$, provided $0 \leq m+n \leq z$;

(3) an organocyclic compound having conjugated double bonds;

(4) a modified organoaluminum compound having Al—O—Al bond(s), and (5) a silicon oxide and/or an aluminum oxide both satisfying the following characteristics (A) to (E):

(A) An average particle diameter as measured by the sieving method is in the range of 20 to 150 μm.

(B) A specific surface area as measured by the BET method is in the range of 150 to 600 m²/g.

(C) The volume of pores ranging in pore radius from 18 to 1,000 Angstroms as measured by the mercury penetration method is in the range of 0.3 to 2.0 cm³/g, and the ratio of the volume of pores ranging in pore radius from 50 to 500 Å to the volume of pores ranging in pore radius from 18 to 1,000 Å is not less than 50%.

(D) An apparent specific gravity as measured according to JIS K6220-6.8 is not lower than 0.32.

(E) After the particles classified in the range of 53 to 75 μm by the sieving method have been subjected to an ultrasonic disintegration treatment at 40 KHz, 35 W, for 20 minutes, the proportion of 50 μm or smaller particles, (the degree of ultrasonic disintegration), is not more than 30%.

The present invention, in the second aspect thereof, resides in a process for preparing a polyolefin by homopolymerizing or copolymerizing at least one olefin in the presence of the above solid catalyst.

DETAILED DESCRIPTION OF THE INVENTION

The present invention will be described in more detail hereinafter.

<1> Solid Catalyst for Olefin Polymerization

As mentioned above, the solid catalyst for olefin polymerization used in the present invention is prepared by mutually contacting the following components (1) to (5):

(1) a compound represented by the general formula $Me^1R^1_p(OR^2)_qX^1_{4-p-q}$, (2) a compound represented by the general formula $Me^2R^3_m(OR^4)_nX^2_{z-m-n}$, (3) an organocyclic compound having conjugated double bonds, (4) a modified organoaluminum compound having Al—O—Al bond(s), and (5) porous particles of a silicon oxide and/or an aluminum oxide both having specific properties.

Reference will first be made to constituent (1), namely, a compound of the general formula $Me^1R^1_p(OR^2)_qX^1_{4-p-q}$. $R^1$ and $R^2$ in this formula are each independently a hydrocarbon group having 1 to 24, preferably 1 to 12, more preferably 1 to 8, carbon atoms. As examples of such hydrocarbon group are mentioned alkyl groups such as methyl, ethyl, propyl, isopropyl, cyclopropyl, butyl, isobutyl, tert-butyl, cyclobutyl, pentyl, isopentyl, neopentyl, cyclopentyl, hexyl, isohexyl, cyclohexyl, heptyl and octyl, alkenyl groups such as vinyl and allyl, aryl groups such as phenyl, tolyl, xylyl, mesityl, indenyl and naphthyl, and aralkyl groups such as benzyl, trityl, phenethyl, styryl, benzhydryl, phenylbutyl, phenylpropyl and neophyl. These groups may have branches. Further, in the above formula, $X^1$ is a halogen atom selected from fluorine, iodine, chlorine and bromine, $Me^1$ is Zr, Ti or Hf, preferably Zr, and p and q are each an integer in the ranges of $0 \leq p \leq 4$ and $0 \leq q \leq 4$, provided $0 \leq p+q \leq 4$, preferably $0 < p+q \leq 4$.

Suitable examples of constituent (1) include tetramethylzirconium, tetraethylzirconium, tetrapropylzirconium, tetra-n-butylzirconium, tetrapentylzirconium, tetraphenylzirconium, tetratolylzirconium, tetrabenzylzirconium, tetraallylzirconium, tetraneophylzirconium, tetramethoxyzirconium, tetraethoxyzirconium, tetrapropoxyzirconium, tetrabutoxyzirconium, tetrapentyloxyzirconium, tetraphenoxyzirconium, tetratolyloxyzirconium, tetrabenzyloxyzirconium, tetraallyloxyzirconium, tetraallyloxyzirconium, tetraneophyloxyzirconium, trimethylmonochlorozirconium, triethylmonochlorozirconium, tripropylmonochlorozirconium, tri-n-butylmonochlorozirconium, tripentylmonochlorozirconium, triphenylmonochlorozirconium, tritolylmonochlorozirconium, tribenzylmonochlorozirconium, triallylmonochlorozirconium, trineophylmonochlorozirconium, dimethyldichlorozirconium, diethyldichlorozirconium, dipropyldichlorozirconium, di-n-butyldichlorozirconium, dipentyldichlorozirconium, diphenyldichlorozirconium, ditolyldichlorozirconium, dibenzyldichlorozirconium, diallyldichlorozirconium, dineophyldichlorozirconium, monomethyltrichlorozirconium, monoethyltrichlorozirconium, monopropyltrichlorozirconium, mono-n-butyltrichlorozirconium, monopentyltrichlorozirconium, monophenyltrichlorozirconium, monotolyltrichlorozirconium, monobenzyltrichlorozirconium, monoallyltrichlorozirconium, mononeophyltrichlorozirconium, tetrachlorozirconium, trimethoxymonochlorozirconium, dimethoxydichlorozirconium, monomethoxytrichlorozirconium, triethoxymonochlorozirconium, diethoxydichlorozirconium, monoethoxytrichlorozirconium, tripropylmonochlorozirconium, dipropyldichlorozirconium, monopropyltrichlorozirconium, tri-n-butoxymonochlorozirconium, di-n-butoxydichlorozirconium, mono-n-butoxytrichlorozirconium, tripentyloxymonochlorozirconium, dipentyloxydichlorozirconium, monopentyloxytrichlorozirconium, triphenoxymonochlorozirconiuin, diphenoxydichlorozirconium, monophenoxytrichlorozirconium, tritolyloxymonochlorozirconium, ditolyloxydichlorozirconium, monotolyloxytrichlorozirconium, tribenzyloxymonochlorozirconium, dibenzyloxydichlorozirconium, monobenzyloxytrichlorozirconium, triallyloxymonochlorozirconium, diallyloxydichlorozirconium, monoallyloxytrichlorozirconium, trineophyloxymonochlorozirconium, dineophyloxydichlorozirconium, mononeophyloxytrichlorozirconium, tetrabromozirconium, trimethylmonobromozirconium, triethylmonobromozirconium, tripropylmonobromozirconium, tri-n-butylmonobromozirconium, tripentylmonobromozirconium, triphenylmonobromozirconium, tritolylmonobromozirconium, tribenzylmonobromozirconium, triallylmonobromozirconium, trineophylmonobromozirconium, dimethyldibromozirconium, diethyldibromozirconium, dipropyldibromozirconium, di-n-butyldibronozirconium, dipentyldibromozirconium, diphenyldibromozirconium, ditolyldibromozirconium, dibenzyldibromozirconium, diallyldibromozirconium, dineophyldibromozirconium, monomethyltribromozirconium, monoethyltribromozirconium, monopropyltribromozirconium, mono-n-butyltribromozirconium, monopentyltribromozirconium, monophenyltribromozirconium, monotolyltribromozirconium, monobenzyltribromozirconium, monoallyltribromozirconium, mononeophyltribromozirconium, trimethoxymonobromozirconium, dimethoxydibromozirconium, monomethoxytribromozirconium, triethoxymonobromozirconium, diethoxydibromozirconium, monoethoxytribromozirconium, tripropoxymonobromozirconium, dipropoxydibromozirconium, monopropoxytribromozirconium, tri-n-butoxymonobromozirconium, di-n-butoxydibromozirconium, mono-n-butoxytribromozirconium, tripentyloxymonobromozirconium, dipentyloxydibromozirconium, monopentyloxytribromozirconium, triphenoxymonobromozirconium, diphenoxydibromozirconium, monophenoxytribromozirconium, tritolyloxymonobromozirconium, ditolyloxydibromozirconium, monotolyloxytribromozirconium, tribenzyloxymonobromozirconium, dibenzyloxydibromozirconium, monobenzyloxytribromozirconium, triallyloxymonobromozirconium, diallyloxydibromozirconium, monoallyloxytribromozirconium, trineophyloxymonobromozirconium, dineophyloxydibromozirconium, mononeophyloxytribromozirconium, tetraiodozirconium, trimethylmonoiodozirconium, triethylmonoiodozirconium, tripropylmonoiodozirconium, tri-n-butylmonoiodozirconium, tripentylmonoiodozirconium, triphenylmonoiodozirconium, tritolylmonoiodozirconium, tribenzylmonoiodozirconium, triallylmonoiodozirconium, trineophylmonoiodozirconium, dimethyldiiodozirconium, diethyldiiodozirconium, dipropyldiiodozirconium, di-n-butyldiiodozirconium, dipentyldiiodozirconium, diphenyldiiodozirconium, ditolyldiiodozirconium, dibenzyldiiodozirconium, diallyldiiodozirconium, dineophyldiiodozirconium, monomethyltriiodozirconium, monoethyltriiodozirconium, monopropyltriiodozirconium, mono-n-butyltriiodozirconium, monopentyltriiodozirconium, monophenyltriiodozirconium, monotolyltriiodozirconium, monobenzyltriiodozirconium, trimethoxymonoiodozirconium, dimethoxydiiodozirconium, monomethoxytriiodozirconium, triethoxymonoiodozirconium, diethoxydiiodozirconium, monoethoxytriiodozirconium, tripropoxymonoiodozirconium, dipropoxydiiodozirconium, monopropoxytriiodozirconium, tri-n-butoxymonoiodozirconium, di-n-butoxydiiodozirconium, mono-n-butoxytriiodozirconium, tripentyloxymonoiodozirconium, dipentyloxydiiodozirconium, monopentyloxytriiodozirconium, triphenoxymonoiodozirconium, diphenoxydiiodozirconium, monophenoxytriiodozirconium, tritolyloxymonoiodozirconium, ditolyloxydiiodozirconium, monotolyloxytriiodozirconium, tribenzyloxymonoiodozirconium, dibenzyloxydiiodozirconium, monobenzyloxytriiodozirconium, triallyloxymonoiodozirconium, diallyloxydiiodozirconium, monoallyloxytriiodozirconium, trineophyloxymonoiodozirconium, dineophyloxydiiodozirconium, mononeophyloxytriiodozirconium, tribenzylmonomethoxyzirconium, tribenzylmonoethoxyzirconium, tribenzylmonopropoxyzirconium, tribenzylmonobutoxyzirconium, tribenzylmonopentyloxyzirconium, tribenzylmonophenoxyzirconium, tribenzylmonotolyloxyzirconium, tribenzylmonobenzyloxyzirconium, tribenzylmonoallyloxyzirconium, tribenzylmononeophyloxyzirconium, dibenzyldimethoxyzirconium, dibenzyldiethoxyzirconium, dibenzyldipropoxyzirconium, dibenzyldibutoxyzirconium, dibenzyldipentyloxyzirconium, dibenzyldiphenoxyzirconium, dibenzylditolyloxyzirconium, dibenzyldibenzyloxyzirconium, dibenzyldiallyloxyzirconium, dibenzyldineophyloxyzirconium, monobenzyltrimethoxyzirconium, monobenzyltriethoxyzirconium, monobenzyltripropoxyzirconium, monobenzylmonobutoxyzirconium, monobenzyltripentyloxyzirconium, monobenzyltriphenoxyzirconium, monobenzyltritolyloxyzirconium, monobenzyltribenzyloxyzirconium, monobenzyltriallyloxyzirconium, monobenzyltrineophyloxyzirconium, trineophylmonomethoxyzirconium, trineophylmonoethoxyzirconium, trineophylmonopropoxyzirconium, trineophylmonobutoxyzirconium, trineophylmonophenoxyzirconium, dineophyldimethoxyzirconium, dineophyldiethoxyzirconium, dineophyldipropoxyzirconium, dineophyldibutoxyzirconium, dineophyldiphenoxyzirconium, mononeophyltrimethoxyzirconium, mononeophyltriethoxyzirconium, mononeophyltripropoxyzirconium, mononeophyltributoxyzirconium, monononeophyltriphenoxvzirconiuim, tetramethyltitanium, tetraethyltitanium, tetrapropyltitanium, tetra-n-butyltitanium, tetrapentyltitanium, tetraphenyltitanium, tetratolyltitanium, tetrabenzyltitanium, tetraallyltitanium, tetraneophyltitanium, tetramethoxytitanium, tetraethoxytitanium, tetrapropoxytitanium, tetrabutoxytitanium, tetrapentyloxytitanium, tetraphenoxytitanium, tetratolyloxytitanium, tetrabenzyloxytitanium, tetraallyloxytitanium, tetraneophyloxytitanium, trimethylmonochlorotitanium, triethylmonochlorotitanium, tripropylmonochlorotitanium, tri-n-butylmonochlorotitanium, dimethyldichlorotitanium, tribenzylmonochlorotitanium, dimethyldichlorotitanium, diethyldichlorotitanium, di-n-butyldichlorotitanium, dibenzyldichlorotitanium, monomethyltrichlorotitanium, monoethyltrichlorotitanium, mono-n-butyltrichlorotitanium, monobenzyltrichlorotitanium, monoallyltrichlorotitanium, mononeophyltrichlorotitanium, tetrachlorotitanium, trimethoxymonochlorotitanium, dimethoxydichlorotitanium, monomethoxytrichlorotitanium, triethoxymonochlorotitanium, diethoxydichlorotitanium, monoethoxytrichlorotitanium, tripropoxymonochlorotitanium, dipropyldichlorotitanium, monopropyltrichlorotitanium, tri-n-butoxymonochlorotitanium, di-n-butoxydichlorotitanium, mono-n-butoxytrichlorotitanium, tripentyloxymonochlorotitanium, dipentyloxydichlorotitanium, monopentyloxytrichlorotitanium, triphenoxymonochlorotitanium, diphenoxydichlorotitanium, monophenoxytrichlorotitanium, tritolyloxymonochlorotitanium, ditolyloxydichlorotitanium, monotolyloxytrichlorotitanium, tribenzyloxymonochlorotitanium, dibenzyloxydichlorotitanium, monobenzyloxytrichloratitanium, tetrabromotitanium, trimethylmonobromotitanium, triethylmonobromotitanium, tripropylmonobromotitanium, tri-n-butylmonobromotitanium, tribenzylmonobromotitanium, dimethyldibromotitanium, diethyldibromotitanium, di-n-butyldibromotitanium, dibenzyldibromotitanium, monomethyltribromotitanium, monoethyltribromotitanium, mono-n-butyltribromotitanium, monobenzyltribromotitanium, trimethoxymonobromotitanium, dimethoxydibromotitanium, monomethoxytribromotitanium, triethoxymonobromotitanium, diethoxydibromotitanium, monoethoxytribromotitanium, tripropoxymonobromotitanium, dipropoxydibromotitanium, monopropoxytribromotitanium, tri-n-butoxymonobromotitanium, di-n-butoxydibromotitanium, mono-n-butoxytribromotitanium, tripentyloxymonobromotitanium, dipentyloxydibromotitanium, monopentyloxytribromotitanium, triphenoxymonobromotitanium, diphenoxydibromotitanium, monophenoxytribromotitanium, tritolyloxymonobromotitanium, ditolyloxydibromotitanium, monotolyloxytribromotitanium, tribenzyloxymonobromotitanium, dibenzyloxydibromotitanium, monobenzyloxytribromotitanium, tetraiodotitanium, trimethylmonoiodotitanium, triethylmonoiodotitanium, tripropylmonoiodotitanium, tri-n-butylmonoiodotitanium, tribenzylmonoiodotitanium, dimethyldiiodotitanium, diethyldiiodotitanium, di-n-butyldiiodotitanium, dibenzyldiiodotitanium, monomethyltriiodotitanium, monoethyltriiodotitanium, mono-n-butyltriiodotitanium, monobenzyltriiodotitanium, trimethoxymonoiodotitanium, dimethoxydiiodotitanium, monomethoxytriiodotitanium, triethoxymonoiodotitanium, diethoxydiiodotitanium, monoethoxytriiodotitanium, tripropoxymonoiodotitanium, dipropoxydiiodotitanium, monopropoxytriiodotitanium, tri-n-butoxymonoiodotitanium, di-n-butoxydiiodotitanium, mono-n-butoxytriiodotitanium, tripentyloxymonoiodotitanium, dipentyloxydiiodotitanium, monopentyloxytriiodotitanium, triphenoxymonoiodotitanium, diphenoxydiiodotitanium, monophenoxytriiodotitanium, tritolyloxymonoiodotitanium, ditolyloxydiiodotitanium, monotolyloxytriiodotitanium, tribenzyloxymonoiodotitanium, dibenzyloxydiiodotitanium, monobenzyloxytriiodotitanium, tribenzylmonomethoxytitanium, tribenzylmonoethoxytitanium, tribenzylmonopropoxytitanium, tribenzylmonobutoxytitanium, tribenzylmonophenoxytitanium, dibenzyldimethoxytitanium, dibenzyldiethoxytitanium, dibenzyldipropoxytitanium, dibenzyldibutoxytitanium, dibenzyldiphenoxytitanium, monobenzyltrimethoxytitanium, monobenzyltriethoxytitanium, monobenzyltripropoxytitanium, monobenzyltributoxytitanium, monobenzyltriphenoxytitanium, trineophylmonomethoxytitanium, trineophylmonoethoxytitanium, trineophylmonopropoxytitanium, trineophylmonobutoxytitanium, trineophylmonophenoxytitanium, dineophyldimethoxytitanium, dineophyldiethoxytitanium, dineophyldipropoxytitanium, dineophyldibutoxytitanium, dineophyldiphenoxytitanium, mononeophyltrimethoxytitanium, mononeophyltriethoxytitanium, mononeophyltripropoxytitanium, mononeophyltributoxytitanium, mononeophyltriphenoxytitanium, tetramethylhafnium, tetraethylhafnium, tetrapropylhafnium, tetra-n-butylhafnium, tetrapentylhafnium, tetraphenylhafnium, tetratolylhafnium, tetrabenzylhafnium, tetraallylhafnium, tetraneophylhafnium, tetramethoxyhafnium, tetraethoxyhafnium, tetrapropoxyhafnium, tetrabutoxyhafnium, tetrapentyloxyhafnium, tetraphenoxyhafnium, tetratolyloxyhafnium, tetrabenzyloxyhafnium, tetraallyloxyhafnium, tetraneophyloxyhafnium, trimethylmonochlorohafnium, triethylmonochlorohafnium, tripropylmonochlorohafnium, tri-n-butylmonochlorohafnium, tribenzylmonochlorohafnium, dimethyldichlorohafnium, diethyldichlorohafnium, di-n-butyldichlorohafnium, dibenzyldichlorohafnium, monomethyltrichlorohafnium, monoethyltrichlorohafnium, mono-n-butyltrichlorohafnium, monobenzyltrichlorohafnium, tetrachlorohafnium, trimethoxymonochlorohafnium, dimethoxydichlorohafnium, monomethoxytrichlorohafnium, triethoxymonochlorohafnium, diethoxydichlorohafnium, monoethoxytrichlorohafnium, tripropoxymonochlorohafnium, dipropoxydichlorohafnium, monopropoxytrichlorohafnium, tri-n-butoxymonochlorohafnium, di-n-butoxydichlorohafnium, mono-n-butoxytrichlorohafnium, tripentyloxymonochlorohafnium, dipentyloxydichlorohafnium, monopentyloxytrichlorohafnium, triphenoxymonochlorohafnium, diphenoxydichlorohafnium, monophenoxytrichlorohafnium, tritolyloxymonochlorohafnium, ditolyloxydichlorohafnium, monotolyloxytrichlorohafnium, tribenzyloxymonochlorohafnium, dibenzyloxydichlorohafnium, monobenzyloxytrichlorohafnium, tetrabromohafnium, trimethylmonobromohafnium, triethylmonobromohafnium, tripropylmonobromohafnium, tri-n-butylmonobromohafnium, tribenzylmonobromohafnium, dimethyldibromohafnium, diethyldibromohafnium, di-n-butyldibromohafnium, dibenzyldibromohafnium, monomethyltribromohafnium, monoethyltribromohafnium, mono-n-butyltribromohafnium, monobenzyltribromohafnium, trimethoxymonobromohafnium, dimethoxydibromohafnium, monomethoxytribromohafnium, triethoxymonobromohafnium, diethoxydibromohafnium, monoethoxytribromohafnium, tripropoxymonobromohafnium, dipropoxydibromohafnium, monopropoxytribromohafnium, tri-n-butoxymonobromohafnium, di-n-butoxydibromohafnium, mono-n-butoxytribromohafnium, tripentyloxymonobromohafnium, dipentyloxydibromohafnium, monopentyloxytribromohafnium, triphenoxymonobromohafnium, diethoxydibromohafnium, monophenoxytribromohafnium, tritolyloxymonobromohafnium, ditolyloxydibromohafnium, monotolyloxytribromohafnium, tribenzyloxymonobromohafnium, dibenzyloxydibromohafnium, monobenzyloxytribromohafnium, tetraiodohafnium, trimethylmonoiodohafnium, triethylmonoiodohafnium, tripropylmonoiodohafnium, tri-n-butylmonoiodohafnium, tribenzylmonoiodohafnium, dimethyldiiodohafnium, diethyldiiodohafnium, di-n-butyldiiodohafnium, dibenzyldiiodohafnium, monomethyltriiodohafnium, monoethyltriiodohafnium, mono-n-butyltriiodohafnium, monobenzyltriiodohafnium, trimethoxymonoiodohafnium, dimethoxydiiodohafnium, monomethoxytriiodohafnium, triethoxymonoiodohafnium, diethoxydiiodohafnium, monoethoxytriiodohafnium, tripropoxymonoiodohafnium, dipropoxydiiodohafnium, monopropoxytriiodohafnium, tri-n-butoxymonoiodohafnium, di-n-butoxydiiodohafnium, mono-n-butoxytriiodohafnium, tripentyloxymonoiodohafnium, dipentyloxydiiodohafnium, monopentyloxytriiodohafnium, triphenoxymonoiodohafnium, diphenoxydiiodohafnium, monophenoxytriiodohafnium, tritolyloxymonoiodohafnium, ditolyloxydiiodohafnium, monotolyloxytriiodohafnium, tribenzyloxymonoiodohafnium, dibenzyloxydiiodohafnium, monobenzyloxytriiodohafnium, tribenzylmonomethoxyhafnium, tribenzylmonoethoxyhafnium, tribenzylmonopropoxyhafnium, tribenzylmonobutoxyhafnium, tribenzylmonophenoxyhafnium, dibenzyldimethoxyhafnium, dibenzyldiethoxyhafnium, dibenzyldipropoxyhafnium, dibenzyldibutoxyhafnium, dibenzyldiphenoxyhafnium, monobenzyltrimethoxyhafnium, monobenzyltriethoxyhafnium, monobenzyltripropoxyhafnium, monobenzyltributoxyhafnium, monobenzyltriphenoxyhafnium, trineophylmonomethoxyhafnium, trineophylmonoethoxyhafnium, trineophylmonopropoxyhafnium, trineophylmonobutoxyhafnium, trineophylmonophenoxyhafnium, dineophyldimethoxyhafnium, dineophyldiethoxyhafnium, dineophyldipropoxyhafnium, dineophyldibutoxyhafnium, dineophyldiphenoxyhafnium, mononeophyltrimethoxyhafnium, mononeophyltriethoxyhafnium, mononeophyltripropoxyhafnium, mononeophyltributoxyhafnium, and mononeophyltriphenoxyhafnium.

It goes without saying that in the compounds reffered to above as examples of constituent (1) there is included not only the case where $R^1$ and $R^2$ in the general formula concerned are n- groups but also the case where they are isomeric groups of various structures such as iso-, s-, t- and neo-.

Among the compounds exemplified above, tetramethylzirconium, tetraethylzirconium, tetrabenzylzirconium, tetrapropoxyzirconium, tripropoxymonochlorozirconium, tetrabutoxyzirconium, tetrabutoxytitanium, and tetrabutoxyhafnium are preferred. Particularly preferred are the compounds represented by the formula $Zr(OR)_4$, including tetrapropoxyzirconium and tetrabutoxyzirconium. These compounds may be used as a mixture of two or more.

The following description is now provided about constituent (2), namely, a compounds of the general formula $Me^2R^3{}_m(OR^4)_nX^2{}_{z-m-n}$. $Me^2$ is a Group I–III element in the Periodic Table. Examples are mentioned lithium, sodium, potassium, magnesium, calcium, zinc, boron and aluminum. $R^3$ and $R^4$ are each independently a hydrocarbon group having 1 to 24, preferably 1–12, more preferably 1–8, carbon atoms.

As examples are mentioned alkyl groups such as methyl, ethyl, propyl, isopropyl, cyclopropyl, butyl, isobutyl, tertbutyl, cyclobutyl, pentyl, isopentyl, neopentyl, cyclopentyl, hexyl, isohexyl, cyclohexyl, heptyl and octyl, alkenyl groups such as vinyl and allyl, aryl groups such as phenyl, tolyl, xylyl, mesityl, indenyl and naphthyl, and aralkyl groups such as benzyl, trityl, phenethyl, styryl, benzhydryl, phenylbutyl, phenylpropyl and neophyl. These groups may have branches. Further, in the above formula, $X^2$ is a halogen atom such as fluorine, iodine, chlorine or bromine or hydrogen atom, provided when $X^2$ is a hydrogen atom, $Me^2$ is limited to a Group III element such as boron or aluminum. z is the valence of $Me^2$, m is $0 \leq m \leq z$, n is $0 \leq n \leq z$, provided $0 \leq m+n \leq z$, preferably they are each an integer.

Suitable examples of constituent (2) include methyllithium, ethyllithium, propyllithium, isopropyllithium, butyllithium, t-butyllithium, pentyllithium, octyllithium, phenyllithium, benzyllithium, dimethylmagnesium, diethylmagnesium, di-n-propylmagnesium, diisopropylmagnesium, dibutylmagnesium, di-t-butylmagnesium, dipentylmagnesium, dioctylmagnesium, diphenylmagnesium, dibenzylmagnesium, methylmagnesium chloride, ethylmagnesium chloride, propylmagnesium chloride, isopropylmagnesium chloride, butylmagnesium chloride, t-butylmagnesium chloride, pentylmagnesium chloride, octylmagnesium chloride, phenylmagnesium chloride, benzylmagnesium chloride, methylmagnesium bromide, methylmagnesium iodide, ethylmagnesium bromide, ethylmagnesium iodide, propylmagnesium bromide, propylmagnesium iodide, isopropylmagnesium bromide, isopropylmagnesium iodide, butylmagnesium bromide, butylmagnesium iodide, t-butylmagnesium bromide, t-butylmagnesium iodide, pentylmagnesium bromide, pentylmagnesium iodide, octylmagnesium bromide, octylmagnesium iodide, phenylmagnesium bromide, phenylmagnesium iodide, benzylmagnesium bromide, benzylmagnesium iodide, dimethylzinc, diethylzinc, dipropylzinc, diisopropylzinc, di-n-butylzinc, di-t-butylzinc, dipentylzinc, dioctylzinc, diphenylzinc, dibenzylzinc, trimethylboron, triethylboron, tripropylboron, triisopropylboron, tributylboron, tri-t-butylboron, tripentylboron, trioctylboron, triphenylboron, tribenzylboron, trimethylaluminum, triethylaluminum, diethylaluminum chloride, diethylaluminum bromide, diethylaluminum fluoride, diethylaluminum iodide, ethylaluminum dichloride, ethylaluminum dibromide, ethylaluminum difluoride, ethylaluminum diiodide, tripropylaluminum, dipropylaluminum chloride, dipropylaluminum bromide, dipropylaluminum fluoride, dipropylaluminum iodide, propylaluminum dichloride, propylaluminum dibromide, propylaluminum difluoride, propylaluminum diiodide, triisopropylaluminum, diisopropylaluminum chloride, diisopropylaluminum bromide, diisopropylaluminum fluoride, diisopropylaluminum iodide, ethylaluminum sesquichloride, ethylaluminum sesquibromide, propylaluminum sesquichloride, propylaluminum sesquibromide,
butylaluminum sesquichloride, butylaluminum sesquibromide,
isopropylaluminum sesquichloride, isopropylaluminum dibromide, isopropylaluminum difluoride, isopropylaluminum diiodide, tributylaluminum, dibutylaluminum chloride, dibutylaluminum bromide, dibutylaluminum fluoride, dibutylaluminum iodide, butylaluminum dichloride, butylaluminum dibromide, butylaluminum difluoride, butylaluminum diiodide, tri-sec-butylaluminum, di-sec-butylaluminum chloride, di-sec-butylaluminum bromide,
di-sec-butylaluminum fluoride, di-sec-butylaluminum iodide,
sec-butylaluminum dichloride, sec-butylaluminum dibromide,
sec-butylaluminum difluoride, sec-butylaluminum diiodide, tri-tert-butylaluminum, di-tert-butylaluminum chloride, di-tert-butylaluminum bromide, di-tert-butylaluminum fluoride, di-tert-butylaluminum iodide, tert-butylaluminum dichloride, tert-butylaluminum dibromide, tert-butylaluminum
difluoride, tert-butylaluminum diiodide,
triisobutylaluminum, diisobutylaluminum chloride, diisobutylaluminum bromide, diisobutylaluminum fluoride, diisobutylaluminum iodide, isobutylaluminum dichloride, isobutylaluminum dibromide, isobutylaluminum difluoride, isobutylaluminum diiodide, trihexylaluminum, dihexylaluminum
chloride, dihexylaluminum bromide, dihexylaluminum fluoride,
dihexylaluminum iodide, hexylaluminum dichloride, hexylaluminum dibromide, hexylaluminum difluoride, hexylaluminum diiodide, tripentylaluminum, dipentylaluminum
chloride, dipentylaluminum bromide, dipentylaluminum fluoride, dipentylaluminum iodide, pentylaluminum dichloride, pentylaluminum dibromide, pentylaluminum difluoride, pentylaluminum diiodide, methylaluminum methoxide, methylaluminum ethoxide, methylaluminum propoxide, methylaluminum butoxide, dimethylaluminum methoxide, dimethylaluminum ethoxide, dimethylaluminum propoxide, dimethylaluminum butoxide, ethylaluminum methoxide, ethylaluminum ethoxide, ethylaluminum propoxide,
ethylaluminum butoxide, diethylaluminum methoxide, diethylaluminum ethoxide, diethylaluminum propoxide, diethylaluminum butoxide, propylaluminum methoxide, propylaluminum ethoxide, propylaluminum propoxide, propylaluminum butoxide, dipropylaluminum methoxide, dipropylaluminum ethoxide, dipropylaluminum propoxide, dipropylaluminum butoxide, butylaluminum methoxide, butylaluminum ethoxide, butylaluminum propoxide, butylaluminum butoxide, dibutylaluminum methoxide, dibutylaluminum ethoxide, dibutylaluminum propoxide, dibutylaluminum butoxide, aluminum hydride, dimethylaluminum
hydride, diethylaluminum hydride, dipropylaluminum hydride,
di-iso-propylaluminum hydride, dibutylaluminum hydride, di-iso-butylaluminum hydride, dihexylaluminum hydride, dicyclohexylaluminum hydride, methylaluminum dihydride,
ethylaluminum dihydride, propylaluminum dihydride, isopropylaluminum dihydride, butylaluminum dihydride, isobutylaluminum
dihydride, hexylaluminum dihydride,
cyclohexylaluminum dihydride, boron, dimethylboron hydride,
diethylboron hydride, methylboron dihydride, ethylboron dihydride and diboron.

As constituent (3) there is used an organocyclic compound having two or more conjugated double bonds. As examples of constituent (3) are included cyclic hydrocarbons having two or more, preferably 2 to 4, more preferably 2 to 3, conjugated double bonds, and having a total number of carbon atoms of 4 to 24, preferably 4 to 12, preferably cyclic hydrocarbons having one or more rings and a total number of carbon atoms of 4 to 24, preferably 4 to 12, the said rings each having two or more, preferably 2 to 4, more preferably 2 to 3, conjugated double bonds; cyclic hydrocarbons resulting from partial substitution of the above cyclic hydrocarbons with one to six hydrocarbon groups (typically an alkyl or aralkyl group of 1 to 12 carbon atoms); organosilicon compounds containing a cyclic hydrocarbon group having two or more, preferably 2 to 4, more preferably 2 to 3, conjugated double bonds, and a total number of carbon atoms of 4 to 24, preferably 4 to 12, preferably a cyclic hydrocarbon group having one or more rings and a total number of carbon atoms of 4 to 24, preferably 4 to 12, the said rings each having two or more, preferably 2 to 4, more preferably 2 to 3, conjugated double bonds; organosilicon compounds resulting from partial substitution of the above cyclic hydrocarbon groups with one to six hydrocarbon residues; and alkali metal salts (e.g. sodium salts and lithium salts) of these compounds. Particularly preferred are those containing a cyclopentadiene structure in their molecules.

Compounds represented by the following general formula are mentioned as suitable examples of the above cyclic hydrocarbons:

(1)

where $R^1$, $R^2$, $R^3$ and $R^4$ are each independently a hydrogen or a hydrocarbon residue (preferably of 1 to 10 carbon atoms), provided any two of $R^1$, $R^2$, $R^3$ and $R^4$ may conjointly form a cyclic hydrocarbon group.

As examples of the hydrocarbon residue are mentioned such alkyl groups as methyl, ethyl, propyl, isopropyl, butyl, t-butyl, hexyl and octyl, such an aryl group as phenyl, such alkoxy groups as methoxy, ethoxy and propoxy, such an aryloxy group as phenoxy, such an aralkyl group as benzyl, and are further mentioned cycloheptatriene, aryl, and condensed rings thereof, as examples of the skeleton of a cyclic hydrocarbon group in the case of any two conjointly forming the said cyclic hydrocarbon group. More concrete and suitable examples of compounds represented by the above formula are cyclopentadiene, indene, azulene, as well as alkyl-, aryl-, aralkyl-, alkoxy- or aryloxy- substituted derivatives thereof. Compounds with the compounds of the above general formula bonded (crosslinked) through an alkylene group (having usually 2 to 8, preferably 2 to 3, carbon atoms) are also suitable.

The organosilicon compounds having a cyclic hydrocarbon group can be represented by the following general formula:

where A represents the foregoing cyclic hydrocarbon group exemplified by cyclopentadienyl, substituted cyclopentadienyl, indenyl and substituted indenyl. R is hydrocarbon residue having 1 to 24, preferably 1 to 12, carbon atoms, examples of which are such alkyl groups as methyl, ethyl, propyl, isopropyl, butyl, t-butyl, hexyl and octyl, such alkoxy groups as methoxy, ethoxy, propoxy and butoxy, such an aryl group as phenyl, such an aryloxy group as phenoxy, and such an aralkyl group as benzyl, or hydrogen, and L is $1 \leq L \leq 4$, preferably $1 \leq L \leq 3$.

Concrete examples of organocyclic hydrocarbons employable as constituent (3) include cyclopolyenes or substituted cyclopolyenes having 7 to 24 carbon atoms such as cyclopentadiene, methylcyclopentadiene, ethylcyclopentadiene,
t-butylcyclopentadiene, hexylcyclopentadiene,
octylcyclopentadiene, 1,2-dimethylcyclopentadiene,
1,3-dimethylcyclopentadiene, 1,2,4-trimethylcyclopentadiene,
1,2,3,4-tetramethylcyclopentadiene,
pentamethylcyclopentadiene, indene, 4-methyl-1-indene,
4,7-dimethylindene, 4,5,6,7-tetrahydroindene,
cycloheptatriene, methylcycloheptatriene, cyclooctatetraene,
methylcyclooctatetraene, azulene, methylazulene, ethylazulene,
fluorene, and methylfluorene, as well as
monocyclopentadienylsilane, biscyclopentadienylsilane,
triscyclopentadienylsilane, tetrakiscyclopentadienylsilane,
monocyclopentadienylmonomethylsilane,
monocyclopentadienylmonoethylsilane,
monocyclopentadienyldimethylsilane,
monocyclopentadienyldiethylsilane,
monocyclopentadienyltrimethylsilane,
monocyclopentadienyltriethylsilane,
monocyclopentadienylmonomethoxysilane,
monocyclopentadienylmonoethoxysilane,
monocyclopentadienylmonophenoxysilane,
biscyclopentadienylmonomethylsilane,
biscyclopentadienylmonoethylsilane,
biscyclopentadienyldimethylsilane,
biscyclopentadienyldiethylsilane,
biscyclopentadienylmethylethylsilane,
biscyclopentadienyldipropylsilane,
biscyclopentadienylethylpropylsilane,
biscyclopentadienyldiphenylsilane,
biscyclopentadienylphenylmethylsilane,
biscyclopentadienylmonomethoxysilane,
biscyclopentadienylmonoethoxysilane,
triscyclopentadienylmonomethylsilane,
triscyclopentadienylmonoethylsilane,
triscyclopentadienylmonomethoxysilane,
triscyclopentadienylmonoethoxysilane,
3-methylcyclopentadienylsilane,
bis-3-methylcyclopentadienylsilane,
3-methylcyclopentadienylmethylsilane,
1,2-dimethylcyclopentadienylsilane,
1,3-dimethylcyclopentadienylsilane,
1,2,4-trimethylcyclopentadienylsilane,
1,2,3,4-tetramethylcyclopentadienylsilane,
pentamethylcyclopentadienylsilane, monoindenylsilane,
bisindenylsilane, trisindenylsilane, tetrakisindenylsilane,
monoindenylmonomethylsilane, monoindenylmonoethylsilane,
monoindenyldimethylsilane, monoindenyldiethylsilane,
monoindenyltrimethylsilane, monoindenyltriethylsilane,
monoindenylmonomethoxysilane, monoindenylmonoethoxysilane,
monoindenylmonophenoxysilane, bisindenylmonomethylsilane,
bisindenylmonoethylsilane, bisindenyldimethylsilane,
bisindenyldiethylsilane, bisindenylmethylethylsilane,
bisindenyldipropylsilane, bisindenylethylpropylsilane,
bisindenyldiphenylsilane, bisindenylphenylmethylsilane,
bisindenylmonomethoxysilane, bisindenylmonoethoxysilane,
trisindenylmonomethylsilane, trisindenylmonoethylsilane,
trisindenylmonomethoxysilane, trisindenylmonoethoxysilane,
3-methylindenylsilane, bis-3-methylindenylsilane,
3-methylindenylmethylsilane, 1,2-dimethylindenylsilane,
1,3-dimethylindenylsilane, 1,2,4-trimethylindenylsilane,
1,2,3,4-tetramethylindenylsilane and pentamethylindenylsilane.

Compounds with any of the above compounds bonded through an alkylene group (usually having 2 to 8, preferably 2 to 3, carbon atoms) are also employable as constituent (3) in the present invention. Examples of such compounds include bisindenylethane, bis(4,5,6,7-tetrahydro-1-indenyl) ethane, 1,3-propanedenylbisindene, 1,3-propandenylbis(4,5, 6,7-tetrahydro)indene, propylenebis(1-indene), isopropyl(1-indenyl)cyclopentadiene, diphenylmethylene(9-fluorenyl) cyclopentadiene, isopropylcyclopentadienyl-1-fluoreneisopropylbiscyclopentadiene. Of course, two or more of these compounds may be combined for use.

The following description is provided about constituent (4), namely, a modified organoaluminum compound containing Al—O—Al bond. Usually, the modified organoaluminum compound contains 1 to 100, preferably 1 to 50, Al—O—Al bonds in the molecule. The modified organoaluminum compound may be either linear or cyclic.

Such a modified organoaluminum compound is usually prepared by reacting an organoaluminum compound and water. The reaction of an organoaluminum compound and water is performed usually in an inert hdyrocarbon. As the inert hdyrocarbon there may be used any of aliphatic, alicyclic and aromatic hydrocarbons such as pentane, hexane, heptane, cyclohexane, methylcyclohexane, benzene, toluene and xylene, with aliphatic and aromatic hydrocarbons being preferred.

As the organoaluminum compound for use in the preparation of the modified organoaluminum compound there may be preferably used any of compounds represented by the general formula $R_nAlX_{3-n}$ where R is a linear or branched hydrocarbon group such as an alkyl, alkenyl, aryl or aralkyl group having 1 to 18, preferable 1 to 12, carbon atoms, X is a hydrogen atom or a hydrogen atom, and n is an integer in the range of $1 \leq n \leq 3$.

Particularly, trialkylaluminum compounds are preferred, in which the alkyl group may be any of methyl, ethyl, propyl, isopropyl, butyl, isobutyl, pentyl, hexyl, octyl, decyl and dodecyl, with methyl being particularly preferred.

The reaction ratio of water and the organoaluminum compound ($H_2O$/Al mole ratio) is in the range from 0.25/1 to 1.2/1, preferably 0.5/1 to 1/1. The reaction temperature is usually in the range of −70° to 100° C., preferably −20° to 20° C., and a suitable reaction time is selected usually in the range of 5 minutes to 24 hours, preferably 10 minutes to 5 hours. As water for use in the reaction there may be used not only the ordinary water but also water of crystallization contained, for example, in copper sulfate hydrate or aluminum sulfate hydrate.

As typical examples of the modified organoaluminum compounds are mentioned compounds usually called aluminoxanes which may be obtained by reacting an alkyl aluminum and water. It goes without saying that two or more modified organoaluminum compounds may also be used in combination.

(5) Component (5)

The component (5) used in the present invention is constituted by a silicon oxide and/or an aluminum oxide.

The silicon oxide used in the present invention is silica or a double oxide of silicon and at least one another metal selected from Groups I–VI of the Periodic Table.

The aluminum oxide used in the present invention is alumina or a double oxide of aluminum and at least one another metal selected from Groups I–VI of the Periodic Table.

As typical examples of double oxides of silicon or an aluminum and at least one another metal selected from Groups I–VI in the Periodic Table there are mentioned various natural and synthetic double oxides such as $Al_2O_3 \cdot MgO$, $Al_2O_3 \cdot CaO$, $Al_2O_3 \cdot SiO_2$, $Al_2O_3 \cdot MgO \cdot CaO$, $Al_2O_3 \cdot MgO \cdot SiO_2$, $Al_2O_3 \cdot CuO$, $Al_2O_3 \cdot Fe_2O_3$, $Al_2O_3 \cdot NiO$, $SiO_2 \cdot MgO$ $SiO_2 \cdot TiO_2$, $SiO_2 \cdot ZnO$, $Na_2O \cdot Al_2O_3 \cdot SiO_2$, $K_2O \cdot Al_2O_3 \cdot SiO_2$, $CaO \cdot Al_2O_3 \cdot SiO_2$, $ZnO \cdot Al_2O_3 \cdot SiO_2$ and $MgO \cdot Al_2O_3 \cdot SiO_2$. It is to be noted that these formulae are not molecular formulae but represent only compositions and that the structure and component ratio of the double oxide used in the present invention are not specially limited thereby.

The silicon oxide and/or an aluminum oxide (hereinafter referred to as the metal oxide or oxides is preferably calcined at a temperature usually in the range of 200° to 800° C., but may contain a small amount of water adsorbed therein or contain a small amount of impurities.

No matter which metal oxide may be used, it is important for the metal oxide to satisfy the following characteristics (A) to (E).

(A) An average particle diameter as measured by the sieving method is in the range of 20 to 150 μm, preferably 25 to 100 μm, more preferably 30 to 70 μm. If the average particle diameter is smaller than 20 μm, particularly in vapor phase polymerization, the amount of catalyst scattered from the reactor or that of fine polymer particles deposited on the reactor wall increases, thus inducing the formation of a sheet-like polymer, or during molding, there may occur blowing-up of polymer. If the average particle diameter is larger than 150 μm, the bulk density of the resulting polymer will become lower, and particularly when film is formed using the polymer, the film will have an increased number of fish-eyes.

(B) A specific surface area as measured by the BET method is in the range of 150 to 600 m$^2$/g, preferably 180 to 500 m$^2$/g, more preferably 200 to 400 m$^2$/g. If the specific surface area is smaller than 150 m$^2$/g, it is generally impossible to fully support the catalyst component to be supported though this point differs depending on the catalyst component and composition used. On the other hand, if the specific surface area is larger than 600 m$^2$/g, a side reaction is apt to occur when the catalyst component used is supported on the metal oxide, due to a too large quantity of surface hydroxyl groups, and the quantity of unreacted hydroxyl groups also increases, thus causing deterioration of the catalytic activity.

(C) The volume of pores ranging in pore radius from 18 to 1,000 Angstroms as measured by the mercury penetration method is in the range of 0.3 to 2.0 cm$^3$/g, preferably 0.6 to 1.8 cm$^3$/g, more preferably 0.9 to 1.5 cm$^3$/g, and the ratio of the volume of pores ranging in pore radius from 50 to 500 Å to that of pores ranging in pore radius from 18 to 1,000 Å is not less than 50%, preferably not less than 60% and more preferably not less than 70%. The modified organoaluminum compound prepared by the reaction of an organoaluminum compound and water and containing Al—O—Al bond(s), which is one of the catalyst components used in the present invention, is what is called an oligomer, and the molecular size thereof is presumed to be fairly large though it depends on the molecular weight thereof or depends on whether the molecule is a linear molecule or a cyclic molecule. Therefore, in supporting the reaction product of the other catalyst components used in the invention and the above modified organoaluminum compound on the metal oxide or oxides uniformly, it is important that the pore volume be large moderately and that the proportion of large radius pores be high.

If the pore volume is smaller than 0.3 cm$^3$/g, it will be impossible to fully support the catalyst components used, while if the pore volume is larger than 2.0 cm$^3$/g, there easily occurs localization of the catalyst components, and in both cases the resulting polymers will be lower in bulk density. Even if the volume of pores ranging in pore radius between 18 and 1,000 Å is in the range of 0.3 to 2.0 cm$^3$/g, if the ratio thereto of the volume of pores ranging in radius between 50 and 500 Å is smaller than 50%, the catalyst components are not supported to a sufficiently uniform extent, so that the agglomeration of the catalyst is apt to occur and the fluidity of the catalyst is deteriorated, thus leading to a lower bulk density of the resulting polymer. Further, if the proportion of too large pores ranging in radius from 500 to 1,000 Å in comparison with the catalyst component size is high, the localization of the catalyst components occurs easily and the bulk density of the resulting polymer becomes lower.

(D) An apparent specific gravity as measured according to JIS K6220-6.8 is not lower than 0.32, preferably not lower than 0.35, more preferably not lower than 0.37. If the apparent specific gravity is lower than 0.32, there arises the necessity of increasing the size of the vessel for preparing the solid catalyst to be used, but this is disadvantageous when viewed from the industrial standpoint. Besides, the bulk density of the solid catalyst prepared is low, so particularly in vapor phase polylmerization and in the case of feeding the solid catalyst as powder to the reactor, a larger size of apparatus for feeding the solid catalyst is required, which is disadvantageous industrially. The bulk density of the resulting polymer also tends to become lower although the reason for such a tendency is not clear.

(E) After particles classified in the range of between 53 μm and 75 μm by the sieving method have been subjected to an ultrasonic disintegration treatment at 40 KHz, 35 W, for 20 minutes, the proportion of 50 μm or smaller particles, i.e., degree of ultrasonic disintegration, is not more than 30%, preferably not more than 20%, more preferably not more than 15%. If the proportion of 50 μm or smaller particles after the ultrasonic disintegration treatment is larger than 30%, that is, if the particles are easily disintegrated, the metal oxide will be disintegrated by an agitation force at the time of preparing the catalyst using the metal oxide, thus resulting in that the solid catalyst obtained is ill-shaped. Consequently, the shape of polymer produced using the solid catalyst is also bad and the bulk density thereof is low.

Various methods are available for preparing the metal oxides employable in the present invention. There is no special limitation if only the resulting metal oxides possess the foregoing characteristics. A suitable method may be adopted.

For example, as to silica, there may be adopted the following method which uses a precipitated, amorphous silica slurry.

(Preparation of a Precipitated, Amorphous Silica Slurry)

By adding sodium silicate and sulfuric acid simultaneously into a neutral liquid or an aqueous neutral salt solution there occurs a double decomposition reaction to produce a hydrous silicic acid. At this reaction state it is important to control the pH appropriately. During the simultaneous addition the pH is maintained in the range of 2 to 10, preferably 3 to 9, and after the simultaneous addition, ageing is allowed to proceed while keeping the pH in the range of 2 to 5. It is preferred that the concentration of silica at the end of the simultaneous addition be in the range of 1 to 20 wt%. Further, it is preferred that the temperature of the reaction induced by the simultaneous addition be in the range of 50° to 100° C. and that the same reaction be completed in 3 to 20 hours.

The ageing after the simultaneous addition is preferably carried out at a temperature of 50° to 100° C. for 30 minutes to 25 hours. The resulting silica is separated by filtration from the mother liquor, then washed with water to afford silica cake having an $SiO_2$ concentration of 5 to 30 wt%, which is then made into a slurry of a concentration in the range from 5 to 20 wt%, followed by wet pulverization using a beads mill or a pot mill.

The precipitated, amorphous silica slurry thus obtained, which is not larger than 3 μm, preferably not larger than 2 μm, in particle diameter, may be subjected as it is to granulation by spray drying, or may be mixed with silica hydrogel slurry and the resulting mixed slurry may be subjected to granulation by spray drying. Further, there may be adopted a method involving mixing the precipitated silica cake with hydrogel, subsequent wet pulverization and subjecting the resulting mixed slurry to granulation by spray drying.

(Preparation of Hydrogel Slurry)

At the starting alkali silicate there may be used the sodium silicate or potassium silicate of water glass defined as an industrial product by JIS, or an alkali silicate prepared by reacting a highly reactive silica recovered from a clayish material such as acid clay with an alkali metal hydroxide solution.

The concentration of $SiO_2$ in the aqueous alkali silicate solution is in the range of 6 to 28 wt%, preferably diluted to about 10 wt%. The molar ratio of $SiO_2:M_2O$ (M is an alkali metal) is usually in the range from 2:1 to 4:1, preferably 2.5:1 to 3:1.

As a mineral acid to be used in the neutralization reaction, there usually is employed hydrochloric acid or sulfuric acid, but a mixed acid thereof is also employable. The concentration of the aqueous mineral acid solution is usually in the range of 10 to 75 wt%, preferably 20 to 60 wt%.

Regarding how to carry out the neutralization reaction involving contact of both starting materials, there may be adopted, for example, a method in which one starting solution is added into the other starting solution, or a method in which both starting solutions are contacted together under predetermined certain conditions. According to a preferred method, the aqueous alkali silicate solution is poured under vigorous stirring into a predetermined amount of mineral acid, allowing both to react with each other. The neutralization temperature is not specially limited, but is usually not higher than 50° C. A suitable pH value at the end of the neutralization is in the range of 0 to 10.

Hydrosol of silica is produced by the neutralization and it is usually allowed to stand for 30 minutes or longer, and if necessary, the temperature and pH of the reaction product (hydrosol) are adjusted, for conversion into a hydrogel of silica.

The $SiO_2$ concentration of the hydrogel is usually as low as 5 to 30 wt%, but for the purpose of both pore adjustment and the adjustment of water content (increasing the $SiO_2$ concentration) of the hydrogel, it is desirable to heat-treat the hydrogel to the extent of 5% or more in terms of $SiO_2$ concentration. The temperature of this heat treatment is usually in the range of 100° to 170° C. and this treatment can be performed within an autoclave.

The silica hydrogel after the heat treatment is washed with water, then filtered if necessary, to afford a solid hydrogel. The hydrogel is then pulverized coarsely to 20–100 μm in particle diameter, then made into a silica hydrosol slurry with an $SiO_2$ concentration of 15 to 25 wt%, followed by wet pulverization. It is desirable that such wet pulverization be conducted under a high-speed shear using an apparatus capable of effecting a high-speed shear, e.g. a friction inner-plate mill.

(Preparation of Mixed Slurry)

In the case of using a mixed slurry, it is preferable that the precipitated, amorphous silica slurry (A) and the hydrogel slurry (B) be mixed together at an A:B ratio in the range from 9:1 to 1:9 in terms of a weight ratio based on $SiO_2$.

For the preparation of alumina, there may be adopted any of the following methods for example.

A basic aluminum sulfate is prepared by adding a carbonate to an aqueous aluminum sulfate solution and it is then added dropwise into oil at a predetermined speed. After the resulting sol is sphered by the surface tension, heating is performed to obtain alumina hydrogel. The spherical hydrogel is transferred from the oil layer into an aqueous layer for hydrolysis, followed by removal of sulfate ions, filtration and washing with water. After the resulting filtered cake is made into an alumina hydrogel slurry, the slurry is subjected to wet pulverization using a beads mill or a pot mill, followed by spray drying to afford a spherical alumina.

According to another method, bauxite is extracted with caustic soda, followed by filtration, to give sodium aluminate, which is then hydrolyzed into aluminum hydroxide. After subsequent water-washing and filtration, the resulting filtered cake is slurried, which slurry is then subjected to wet pulverization using a beads mill or a pot mill and subsequently to spray drying into a spherical alumina.

According to a further method, the aluminum hydroxide obtained above as an intermediate product or a highly aluminous clay mineral is reacted with sulfuric acid to obtain aluminum sulfate. Then, aluminum hydroxide is precipitated by neutralization with alkali, followed by filtration and water-washing. Thereafter, the resulting slurry is subjected to wet pulverization using a beads mill or a pot mill and subsequent spray drying into a spherical alumina.

Silica-alumina can be prepared in the following manner.

Sulfuric acid is put into a mixer, then sodium silicate is added dropwise under stirring and cooling to give a silica sol having a pH value of 1 to 3. Separately, a basic aluminum sulfate sol is prepared by adding a calcium carbonate powder slowly into a stirred aqueous aluminum sulfate solution. 2–15 parts by volume of the basic aluminum sulfate sol is added and mixed into 100 parts by volume of the silica sol prepared above, then the resulting mixed sol is added dropwise into a heated organic solvent. At this time, the sol is sphered by the surface tension and then converted into a hydrogel. The thus-sphered hydrogel is washed with water to remove ions, followed by wet pulverization using a beads mill or a pot mill and subsequent spray drying, to afford a spherical silica-alumiuna.

Although the metal oxide or oxides may be used as they are as component (5) in the invention, they may be contacted, in advance before use thereof, with an organoaluminum compound such as, for example, trimethylaluminum, triethylaluminum, triisobutylaluminum, tri-n-hexylaluminum, dimethylaluminum chloride, diethylaluminum chloride, or diethylmonoethoxyaluminum or modified organoaluminum compound having Al—O—Al bond(s) which compound will be described later, or a silane compound.

Further, the metal oxide or oxides may be contacted, beforehand prior to use thereof, with an active hydrogen-containing compound such as an alcohol or an aldehyde, an electron donating compound such as ester or an ether, or an alkoxide group-containing compound such as a tetraalkoxysilicate, a trialkoxyaluminum or a transition metal tetraalkoxide. This method is also preferred.

For such a preliminary contact treatment there may be adopted a method wherein the metal oxide or oxides are contacted with a compound for the pretreatment exemplified above, with or without stirring, usually in an inert atmosphere of nitrogen or argon and in the presence of a liquid inert hydrocarbon such as an aromatic hydrocarbon usually having 6 to 12 carbon atoms, e.g. benzene, toluene, xylene or ethylbenzene or an alliphatic or alicyclic hydrocarbon usually having 5 to 12 carbon atoms, e.g. heptane, hexane, decane, dodecane or cyclohexane. This contact treatment is performed usually at a temperature of −100° to 200° C. preferably −50° to 100° C., for 30 minutes to 50 hours, preferably 1 to 24 hours.

It is desirable to carry out the contact reaction in a solvent capable of dissolving the compound for the pretreatment, which solvent is an aromatic hydrocarbon usually having 6 to 12 carbon atoms, such as benzene, toluene, xylene or ethylbenzene. In this case, after the contact reaction, the solvent can be used as it is in preparing the catalyst to be used in the invention without removal of the solvent.

The metal oxide or oxides can be taken out as a solid component (5) by adding to the contact reaction product a liquid inert hydrocarbon (for example, an aliphatic or alicyclic hydrocarbon such as pentane, hexane, decane, dodecane or cyclohexane in the case of the pretreatment compound being a modified organoaluminum compound) which is incapable of dissolving or difficult to dissolve the pretreatment compound, allowing the component (5) to be precipitated and dried, or by removing a portion or the whole of the aromatic hydrocarbon which is the solvent used in the pretreatment, using a suitable means such as drying.

The ratio of the metal oxide or oxides, i.e., silicon oxide and/or aluminum oxide, subjected to the pretreatment, to the pretreatment compound is not specially limited as long as it does not affect the object of the present invention, but the amount of the pretreatment compound is usually selected within the range of 1 to 10,000 mmols, preferably 5 to 1,500 mmols, (Al atom concentration in the case of a modified organoaluminum compound), per 100 gram of the carrier.

(6) How to prepare the Catalyst

In the present invention, the order of contact of the catalyst components (1) to (5) is not specially limited, but the following contacting orders are preferred.

|1| Components (1) to (5) are contacted simultaneously.

|2| Components (1) to (4) are contacted simultaneously, followed by contact with component (5).

|3| Components (1), (2), (3) and (5) are contacted simultaneously, followed by contact with component (4).

|4| Components (1), (2) and (3) are contacted simultaneously, followed by contact with component (4) and subsequent contact with component (5).

|5| Components (1), (2) and (3) are contacted simultaneously, followed by contact with component (5) and subsequent contact with component (4).

|6| Components (1), (2) and (3) are contacted simultaneously, followed by contact with a precontacted product of components (4) and (5).

|7| Components (1) and (2) are contacted together, followed by contact with component (3), subsequent contact with component (4) and last contact with component (5).

|8| Components (1) and (2) are contacted together, followed by contact with component (3), subsequent contact with component (5) and last contact with component (4).

|9| Components (1) and (2) are contacted together, followed by contact with component (3) and subsequent contact with a precontacted product of components (4) and (5).

|10| Components (1) and (2) are contacted together, followed by contact with component (4), subsequent contact with component (3) and last contact with component (5).

|11| Components (1) and (2) are contacted together, followed by contact with a precontacted product of components (3) and (4) and subsequent contact with component (5).

|12| Components (1) and (3) are contacted together, followed by contact with component (2), subsequent contact with component (4) and last contact with component (5).

|13| Components (1) and (3) are contacted together, followed by contact with component (2), subsequent contact with component (5) and last contact with component (4).

|14| Components (1) and (3) are contacted together, followed by contact with component (2) and subsequent contact with a precontacted product of components (4) and (5).

|15| Components (1) and (3) are contacted together, followed by contact with component (4), subsequent contact with component (2) and last contact with component (5).

|16| Components (1) and (3) are contacted together, followed by contact with a precontacted product of components (2) and (4) and last contact with component (5).

|17| Components (1) and (4) are contacted together, followed by contact with component (2), subsequent contact with component (3) and last contact with component (5).

|18| Components (1) and (4) are contacted together, followed by contact with component (3), subsequent contact with component (2) and last contact with component (5).

|19| Components (1) and (4) are contacted together, followed by contact with a precontacted product of components (2) and (3) and last contact with component (5).

|20| Components (1) and (5) are contacted together, followed by contact with a precontacted product of components (2), (3) and (4).

|21| Components (1) and (5) are contacted together, followed by contact with a precontacted product of components (2) and (3), and subsequent contact with component (4).

|22| Components (2) and (3) are contacted together, followed by contact with component (1), subsequent contact with component (4) and last contact with component (5).

|23| Components (2) and (3) are contacted together, followed by contact with component (1), subsequent contact with component (5) and last contact with component (4).

|24| Components (2) and (3) are contacted together, followed by contact with component (1) and subsequent contact with components (4) and (5).

|25| Components (2) and (3) are contacted together, followed by contact with component (4), subsequent contact with component (1) and last contact with component (5).

|26| Components (2) and (3) are contacted together, followed by contact with a precontacted product of components (1) and (4), and subsequent contact with component (5).

|27| Components (2) and (4) are contacted together, followed by contact with component (1), subsequent contact with component (3) and last contact with component (5).

|28| Components (2) and (4) are contacted together, followed by contact with component (3), subsequent contact with component (1) and last contact with component (5).

|29| Components (2) and (4) are contacted together, followed by contact with a precontacted product of components (1) and (3), and last contact with component (5).

|30| Components (3) and (4) are contacted together, followed by contact with component (1), subsequent contact with component (2) and last contact with component (5).

|31| Components (3) and (4) are contacted together, followed by contact with component (2), subsequent contact with component (1) and last contact with component (5).

|32| Components (3) and (4) are contacted together, followed by contact with a precontacted product of components (1) and (2) and last contact with component (5).

|33| Components (1) and (3) are contacted together, followed by contact with a precontacted product of components (2) and (3) and last contact with component (4).

|34| Components (1) and (3) are contacted together, followed by contact with a precontacted product of components (2) and (3) and contact with component (4) and last with component (5).

In the present invention, the component (4) may be contacted in a polymerization reactor with a solid catalyst component which is the contact reaction product of components (1), (2), (3) and (5).

Also as to in what conditions these five components are to be contacted, there is no special limitation, but according to a method usually adopted, the components are contacted with or without stirring in an inert atmosphere of nitrogen or argon and in the presence of a liquid inert hydrocarbon such as an aromatic hydrocarbon usually having 6 to 12 carbon atoms, e.g. benzene, toluene, xylene or ethylbenzene or an alliphatic or alicyclic hydrocarbon usually having 5 to 12 carbon atoms, e.g. heptane, hexane, decane, dodecane or cyclohexane. This contact treatment is performed usually at a temperature of $-100°$ to $200°$ C. preferably $-50°$ to $100°$ C., for 30 minutes to 50 hours, preferably 1 to 24 hours. In the present invention, each contact reaction may be carried out plural times.

As to the ratio of components (1)-(5), component (2) is usually employed in an amount of 0.01 to 100 mols, preferably 0.1 to 50 mols, more preferably 1 to 20 mols, and component (3) is usually employed in an amount of 0.01 to 100 mols, preferably 0.1 to 50 mols, more preferably 1 to 20 mols and component (4) is usually employed in an amount of 1 to 100,000 mols, preferably 5 to 1,000 mols, more preferably 10 to 500 mols, both per mol of component (1). Further, in terms of a transition metal concentration ($Me^1$), component (1) is usually employed in the range of 0.0001 to 10 mmols, preferably 0.001 to 5 mmols, more preferably 0.005 to 1 mmols, per gram of component (5).

The following combination is mentioned as a suitable combination of components (1) to (5) in the catalyst of the present invention: as component (1), a tetraalkylzirconium compound such as tetramethylzirconium or a tetraaralkylzirconium compound such as tetrabenzylzirconium as component (2), a trialkylaluminum compound such as triethylaluminum, triisobutylaluminum, trihexylaluminum or tridecylaluminum, or a halogen-containing alkylaluminum compound such as diethylaluminum chloride or ethylaluminum dichloride, as component (3) indene or an indene derivative such as methylindene or trimethylsilylindene, cyclopentadiene or a cyclopentadiene derivative such as methylcyclopentadiene dimethylcyclopentadiene, trimethylcyclopentadiene or trimethylsilylcyclopentadiene, a compound with an indene or cyclopentadiene derivative bonded through an alkylene group, such as bisindenylethane or isopropylbiscyclopentadiene or a compound represented by the general formula $A_L SiR_{4-L}$ such as dimethylsilylbiscyclopentadiene, as component (4) methylaluminoxane, and as component (5) silica, alumina or silica-alumina.

The following combination is mentioned as another suitable combination: as component (1) a tetraalkyltitanium compound such as tetramethyltitanium, a tetraalkoxytitanium compound such as tetra-n-butoxytitanium or tetraisopropoxytitanium, or tetraaralkyltitanium compound such as tetrabenzyltitanium as component (2), a trialkylaluminum compound such as trimethylaluminum, triethylaluminum, triisobutylaluminum, trihexylaluminum or tridecylaluminum, a halogen-containing alkylaluminum compound such as diethylaluminum chloride or ethylaluminum dichloride, a hydride such as diisobutylaluminum hydride, as component (3) indene, an indene derivative such as methylindene or trimethylsilylindene, cyclopentadiene, a cyclopentadiene derivative such as methylcyclopentadiene dimethylcyclopentadiene, trimethylcyclopentadiene or trimethylsilylcyclopentadiene, a compound with an indene or cyclopentadiene derivative bonded through an alkylene group, such as bisindenylethane or isopropylbiscyclopentadiene or a compound represented by the general formula $A_L SiR_{4-L}$ such as dimethylsilylbiscyclopentadiene, as component (4) methylaluminoxane, and as component (5) silica, alumina or silica-alumina.

The following combination is mentioned as a further suitable combination: as component (1) a tetraalkoxyzirconium compound such as a tetra-n-butoxyzirconium or tetraisopropoxyzirconium, as component (2) a trialkylaluminum compound such as triethylaluminum, triisobutylaluminum, trihexylaluminum or tridecylaluminum, an alkylaluminum alkoxide compound such as diethylaluminum butoxide, ethylbutoxyaluminum or diethylethoxyaluminum, a hydroxide such as diisobutylaluminum hydride, as component (3) indene, an indene derivative such as methylindene or trimethylsilylindene, cyclopentadiene, a cyclopentadiene derivative such as methylcyclopentadiene dimethylcyclopentadiene, trimethylcyclopentadiene or trimethylsilylcyclopentadiene, a compound with an indene or cyclopentadiene derivative bonded through an alkylene group, such as bisindenylethane or isopropylbiscyclopentadiene or a compound represented by the general formula $A_L SiR_{4-L}$ such as dimethylsilylbiscyclopentadiene, as component (4) methylaluminoxane, and as component (5) silica, alumina or silica-alumina.

As a still further suitable combination there is mentioned the following combination: as component (1) a zirconium chloride compound such as a zirconium tetrachloride, phenoxyzirconium trichloride, isopropoxyzirconium trichloride or benzylzirconium trichloride, as component (2) an alkyllithium compound such as butyllithium or methyllithium, or an alkylmagnesium compound such as dibutylmagnesium, ethylmagnesium bromide or butylmagnesium chloride, as component (3) indene, an indene derivative such as methylindene or trimethylsilylindene, cyclopentadiene, a cyclopentadiene derivative such as methylcyclopentadiene, dimethylcyclopentadiene, trimethylcyclopentadiene or trimethylsilylcyclopentadiene, a compound with an indene or cyclopentadiene derivative bonded through an alkylene group, such as bisindenylethane or isopropylbiscyclopentadiene or a compound represented by the general formula $A_L SiR_{4-L}$ such as dimethylsilylbiscyclopentadiene, as component (4) methylaluminoxane, and as component (5) silica, alumina or silica-alumina.

As a still further suitable combination there is mentioned the following combination: as component (1) a tetraalkoxyzirconium compound such as tetra-n-butoxyzirconium or tetraisopropoxyzirconium, as component (2) a trialkylaluminum compound such as trimethylaluminum, triethylaluminum, triisobutylaluminum trihexylaluminum or tridecylaluminum, or a halogen-containing alkylaluminum compound such as diethylaluminum chloride or ethylaluminum dichloride, as component (3) indene, an indene derivative such as methylindene or trimethylsilylindene, cyclopentadiene, a cyclopentadiene derivative such as methylcyclopentadiene, dimethylcyclopentadiene, trimethylcyclopentadiene or trimethylsilylcyclopentadiene, a compound with an indene or cyclopentadiene derivative bonded through an alkylene group, such as bisindenylethane or, isopropylbiscyclopentadiene or a compound represented by the general formula $A_L SiR_{4-L}$ such as dimethylsilylbiscyclopentadiene, as component (4) methylaluminoxane, and as component (5) silica, alumina or silica-alumina.

As a still further suitable combination there is mentioned the following combination: as component (1) a tetraalkylzirconium compound such as tetramethylzirconium or a tetraaralkylzirconium compound such as tetrabenzylzirconium, as component (2) a trialkylaluminum compound such as triethylaluminum, triisobutylaluminum trihexylaluminum or tridecylaluminum, or a halogen-containing alkylaluminum compound such as diethylaluminum chloride or ethylaluminum dichloride, as component (3) indene, an indene derivative such as methylindene or trimethylsilylindene, cyclopentadiene, a cyclopentadiene derivative such as methylcyclopentadiene, dimethylcyclopentadiene, trimethylcyclopentadiene or trimethylsilylcyclopentadiene, a compound with an indene or cyclopentadiene derivative bonded through an alkylene group, such as bisindenylethane or isopropylbiscyclopentadiene or a compound represented by the general formula $A_L SiR_{4-L}$ such as dimethylsilylbiscyclopentadiene, as component (4) methylaluminoxane, and as component (5) silica, alumina or silica-alumina.

<2> Polymerization of Olefins

The olefins as referred to herein include α-olefins, cyclic olefins, dienes, trienes and styrene analogs. As α-olefins employable in the invention there are included those having 2 to 12, preferable 2 to 8, carbon atoms, such as, for example, ethylene, propylene, butene-1, hexene-1 and 4-methylpentene-1. Using the catalyst of the invention, an α-olefin can be homopolymerized, but also two or more α-olefins can be copolymerized. The copolymerization may be any of alternating copolymerization, random copolymerization and block copolymerization.

As examples of the copolymerization of α-olefins there are mentioned copolymerization of ethylene and an α-olefins having 3 to 12, preferably 3 to 8, carbon atoms, such as ethylene/propylene, ethylene/butene-1, ethylene/hexene-1 and ethylene/4-methylpentene-1 as well as copolymerization of propylene and α-olefins having 3 to 12, preferably 3 to 8, carbon atoms such as propylene/butene-1, propylene/4-methylpentene-1, propylene/hexene-1 and propylene/octene-1. In the copolymerization of ethylene or propylene with another α-olefin, the amount of the α-olefin can be selected suitably in the range not exceeding 90 mol% of the total amount of monomers. But it is usually not more than 40 mol%, preferably not more than 30 mol%, more preferably not more than 20 mol%, in the case of ethylene copolymer, while in the case of propylene copolymer, it is selected in the range of 1–90 mol%, preferably 5–90 mol%, more preferably 10–70 mol%.

As cyclic olefins, those having 3 to 24, preferable 3 to 18, carbon atoms are employable in the invention. Examples are cyclopentene, cyclobutene, cyclohexene, 3-methylcyclohexene, cyclooctene, cyclodecene, cyclododecene, tetracyclododecene, octacyclododecene, dicyclopentadiene, norbornene, 5-methyl-2-norbornene, 5-ethyl-2-norbornene, 5-isobutyl-2-norbornene, 5,6-dimethyl-2-norbornene, 5,5,6-trimethyl-2-norbornene and ethyllidene norbornene. Usually, a cyclic olefin is copolymerized with an α-olefin referred to above. In this case, the amount of the cyclic olefin is not larger than 50 mol%, usually in the range of 1–50 mol%, preferably 2–50 mol%.

Dienes and trienes employable in the invention are chain polyenes which can be represented by the following general formula:

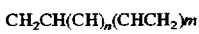

CH$_2$CH(CH)$_n$(CHCH$_2$)$_m$ where m is 1 to 2, and n is 0 to 20, preferably 2 to 20. Examples of such polyenes include butadiene, 1,4-hexadiene, 1,5-hexadiene, 1,9-decadiene, 1,13-tetradecadiene, 2,6-dimethyl-1,5-heptadiene, 2-methyl-2,7-octadiene, 2,7-dimethyl-2,6-octadiene, and 1,5,9-decatriene. In the case of using a chain diene or triene of the above general formula, it is usually copolymerized with an αµ-olefin referred to above, and in this case, the content of chain diene and/or triene in the resulting copolymer is usually in the range of 0.1 to 50 mol%, preferably 0.2 to 10 mol%.

Styrene analogs employable in the invention include styrene and styrene derivatives. As examples of such derivatives mention may be made of t-butylstyrene, α-methylstyrene, p-methylstyrene, divinylbenzene, 1,1-diphenylethylene, N,N-dimethyl-p-aminoethylstyrene and N,N-diethyl-p-aminoethylstyrene.

The catalyst according to the present invention is also suitable for the polymerization of such an olefin homopolymer or copolymer as referred to above further with polar monomer to modify the homopolymer or copolymer. As examples of the polar monomer there are mentioned unsaturated carboxylic acid esters such as, for example, methyl acrylate, methyl methacrylate, butyl methacrylate, dimethyl maleate, diethyl maleate, monomethyl maleate, diethyl fumarate and dimethyl itaconate. The polar monomer content of the thus-modified copolymer is usually in the range of 0.1 to 10 mol%, preferably 0.2 to 2 mol%.

The polymerization reaction may be carried out by slurry polymerization, solution polymerization, or a substantially solvent-free vapor phase polymerization, with slurry polymerization or vapor phase polymerization being particularly preferred. Olefin is polymerized in a substantially oxygen- and water-free condition in the presence or absence of an inert hydrocarbon solvent selected from the group consisting of, for example, aliphatic hydrocarbons such as hexane and heptane, aromatic hydrocarbons such as benzene, toluene and xylene and alicyclic hydrocarbons such as cyclohexane and methylcyclohexane. Usually, the polymerization is performed at a temperature in the range from 20° C. to 200° C., preferably 50° to 100° C., a pressure in the range from atmospheric pressure to 70 kg/cm$^2$G, preferably from atmospheric pressure to 20 kg/cm$^2$/G, for 5 minutes to 10 hours, preferably 5 minutes to 5 hours.

The molecular weight of the resulting polymer can be adjusted to some extent by changing polymerization conditions as polymerization temperature and catalyst molar ratio, but the addition of hydrogen into the polymerization reaction system is more effective for this purpose.

A component for the removal of water, what is called a scavenger, may be added into the polymerization system. As examples of the scavenger there are mentioned organoaluminum compounds such as trimethylaluminum, triethylaluminum and triisobutylaluminum, the foregoing modified organoaluminum compound, branched alkyl-containing modified organoaluminum compounds, organolithium compounds such as butyllithium, and organomagnesium compounds such as diethylmagnesium, dibutylmagnesium and butylmagnesium chloride.

The present invention is also applicable to a multi-stage polymerization of two or more stages involving different hydrogen concentrations and different monomer quantities and different polymerization pressures and temperatures.

Prior to the regular polymerization, the catalyst may be contacted with α-olefins allowing prepolymerization to proceed, and thereafter the catalyst may be fed in the form of such prepolymerization catalyst to the regular polymerization.

Examples

The following examples are given in illustration of, not limitation of, the present invention.

The following methods were adopted for measuring an average particle diameter, specific surface area, pore volume, apparent specific gravity and the degree of ultrasonic disintegration, of the metal oxide used in the invention.

<Average Particle Diameter>

1.5 g of a sample is placed in each of ten standard sieves having an inside diameter of 75 mm (nominal size: 22, 32, 53, 75, 100, 125, 150, 180, 212, 250 μm, respectively), then after shaking for 20 minutes, weight % of the sample on each sieve is plotted on a logarithmic probability paper and a particle diameter corresponding to 50% integrated value is used as an average particle diameter.

<Specific Surface Area>

Measured using an automatic specific surface area measuring device Model 2200 (a product of Shimazu Seisakusho Ltd.) in a conventional manner by the BET method.

<Pore Volume>

Measured at a pressure of 0.033 to 4.200 kg/cm$^2$, using Micromeritics Autopore 9220 (a product of Shimazu Seisakusho Ltd.). The volume of pores (PV-I) ranging in radius between 18 and 1,000 Å and the volume of pores (PV-II) ranging in radius between 50 and 500 Å are read and then the ratio of PV-II/PV-I is determined.

<Apparent Specific Gravity>

Measured in accordance with the apparent specific gravity measuring method defined by JIS K-6220-6.8.

<Degree of Ultrasonic Disintegration>

10 g of a sample is placed in each of standard sieves having an inside diameter of 30 cm and nominal sizes of 53 μm and 75 μm, respectively, and after shaking for 10 minutes, the sample on the 53 μsieve is used in an ultrasonic disintegration test. According to this test, 20 ml of pure water is put into a 50 ml Erlenmeyer flask, into which is then placed 1 g of the sample on the 53 μm sieve, and there is performed an ultrasonic treatment using an ultrasonic washer VS-50R (a product of VELVO-CLEAR Co.) for 20 minutes. Then, 20 g of glycerin is added, a particle size distribution is measured using a particle size distribution measuring device SA-CP3 (a product of Shimazu Seisakusho Ltd.), and the percent of 50 μm or less is used as the degree of ultrasonic disintegration.

The melting point of each polymer obtained was determined by the following method.

<Melting Point>

Using a melting point measuring device Model DSC-20 (a product of Seiko Denshi K.K.), a polymer sample (5 mg) is held at 180° C. for 3 minutes, then cooled to 0° C. at a rate of 10° C./min, and after holding the sample at 0° C. for 10 minutes, the temperature is raised at a rate of 10° C./min to determine the melting point.

<Preparation of Modified Organoaluminum Compound>

13 g of copper sulfate pentahydrate was placed in a three-necked flask having an internal volume of 300 ml and equipped with an electromagnetic induction stirrer and was suspended in 50 ml of toluene. Then, 150 ml of solution containing 1 mmol/ml of trimethylaluminum was added dropwise into the resulting suspension at 0° C. over a 2 hour period. Thereafter, the temperature was raised to 25° C. and reaction was allowed to take place at that temperature for 24 hours. Subsequently, the reaction solution was filtered to remove toluene contained therein, thereby affording 4 g of methylaluminoxane as white crystals.

<Preparation of Solid Catalyst>

Table 1 shows properties of silicon compounds and/or aluminum compounds used as component (5) in the following working examples and comparative examples.

The silicon oxide particles used were prepared by the following methods.

(Preparation of Silica I)

A solution of commerically available No. 3 sodium silicate (22% as $SiO_2$ and 7% as $NaO_2$) and 13% sulfuric acid were added dropwise simultaneously under stirring into hot water heated to 85° C. During the simultaneous addition the pH was maintained at 7 to 8, and after the simultaneous addition, aging was allowed to proceed at pH 3 to 4 for 1 hour at 85° C. The concentration of $SiO_2$ at the end of the simultaneous addition was 4 wt%.

Then, the produced mixture was filtered and washed with water to afford silica cake having a $SiO_2$ concentration of 12%. The silica cake was made into a slurry of a $SiO_2$ concentration of 10% by adding water, followed by wet pulverization under high speed shear by using DYNO-MILL, manufactured by Shinmaru Enterprises Corp. to adjust the particle diameter to 1.2 μm. The precipitated, amorphous silica slurry thus obtained was spray-dried by using SD-25 spray dryer, manufactured by Ashizawa-Niro Atomizer Ltd. to obtain a spherical silica (Silica I). The properties are shown in Table 1.

(Preparation of Silica II)

A spherical silica was prepared in the same manner as above except that the particle diameter of silica in the wet pulverized slurry was made to 1.3 μm. The properties are shown in Table 1.

(Preparation of Silica III)

A spherical silica was prepared in the same manner as in Silica I except that the particle diameter of silica in the wet pulverized slurry was made to 1.4 μm. The properties are shown in Table 1.

(Preparation of Silica IV)

A spherical silica was prepared in the same manner as in Silica I except that the particle diameter was made to 1.8 μm. The properties are shown in Table 1.

(Preparation of Silica VII)

Gelling method:

A solution of a commercially available No. 3 sodium silicate (22% as $SiO_2$, 7% as NaO 2) and 45% sulfuric acid were reacted to produce a silica hydrosol at 40° C. and pH 2.1. After the reaction, the product was allowed to stand for

27

40 minutes to obtain a silica hydrosol having a SiO₂ concentration of 28 wt%. Then the hydrogel was broken into 2 to 5 mm in diameter and washed with water sufficiently. Then, aging was allowed to proceed for 4 hours under hydrothermal condition at 135° C. The gel was pluverized coarsely by means of a Nara model mill M-4 to obtain an aqueous slurry having a SiO₂ concentration of 18 wt%. Then the aqueous slurry was wet-pulverized by using DYNO-MILL, manufactured by Shinmaru Enterprises Cor. to adjust the particle diameter to 1.6 μm. The hydrogel slurry thus obtained was spray dried by using SD-25 spray dryer, manufactured by Ashizawa-Niro Atomizer Ltd. to obtain a spherical silica (silica VII). The properties are shown in Table 1.

(Preparation of Silica VIII)

A spherical silica was prepared in the same manner as in Silica VII except that the particle diameter of silica in the wet pulverized slurry was made to 3.0 μm. The properties are shown in Table 1.

(Preparation of Silica IX)

A spherical silica was prepared in the same manner as in Silica VII except that the particle diameter of silica in the wet pulverized slurry was made to 4.5 μm. The properties are shown in Table 1.

Example 1

(1) Preparation of Solid Catalyst 150 ml of purified toluene 3.3 g of zirconium tetrapropoxide (Zr(OPr)₄) and 6.6 g of cyclopentadiene were fed in a nitrogen atmosphere into a three-necked 300 ml flask equipped with an electromagnetic induction stirrer, and stirring was performed at room temperature for 30 minutes. Thereafter, 11.4 g of triethylaluminum was added dropwise over a period of 30 minutes, followed by stirring at room temperature for 5 hours. The concentration of the resulting solution was 0.06 mmol/ml as Zr.

100 ml of purified toluene, 5 ml of the solution prepared above and 12 ml of a methylaluminoxane solution in toluene (concentration: 2.5 mmol/ml) were charged into a three-necked 300 ml flask equipped with an electromagnetic induction stirrer, and stirring was performed at room temperature for 2 hours.

Next, 5 g of silica I shown in Table 1 which silica had been calcined at 600° C. for 5 hours was added and stirring was conducted at room temperature for 2 hours, followed by blowing of nitrogen, at 40° C. for 1 hours and Subsequent drying at 40° C. under reduced pressure for 1 hour, to afford a solid catalyst superior in fluidity.

(2) Vapor Phase Polymerization

A stainless steel autoclave equipped with a stirrer was used as a vapor phase polymerization apparatus, and a loop was formed using a blower, a flow control device and a dry cyclone. The temperature of the autoclave was adjusted by flowing warm water through a jacket of the autoclave. Into the autoclave held at 75° C. were fed ethylene and butene-1 gases while adjusting the butene-1/ethylene mol ratio in the autoclave to 0.07. The gases in the system were circulated by the blower while maintaining the total pressure at 8 kg/cm²G, and the solid catalyst prepared above was fed at a rate of 100 mg/hr. In this condition, polymerization was carried out continuously for 10 hours while withdrawing the resulting polymer intermittently.

Catalytic efficiency was 162,000 g.copolymer/g.Zr, thus showing an extremely high activity. The resulting ethylene copolymer was a round particulate matter having a melt flow rate (MFR) 1.62 g/10 min, a density 0.9201 g/cm³, a bulk density of 0.49 g/cm³ and an average particle diameter of 670 μm. After the continuous 10-hour polymerization, the interior of the autoclave was checked to find that polymer was deposited neither on the inner wall of the autoclave nor on the stirrer.

Example 2

A solid catalyst was prepared in the same way as in Example 1 except that silica II shown in Table 1 was used in place of silica I in the same table. Then, using the solid catalyst, a vapor phase polymerization was carried out under the same conditions as in Example 1. The results obtained are as set forth in Table 2.

Example 3

A solid catalyst was prepared in the same way as in Example 1 except that silica III shown in Table 1 was used in place of silica I in the same table. Then, using the solid catalyst, a vapor phase polymerization was carried out under the same conditions as in Example 1. The results obtained are as set forth in Table 2.

Example 4

A solid catalyst was prepared in the same way as in Example 1 except that silica IV shown in Table 1 was used in place of silica I in the same table. Then, using the solid catalyst, a vapor phase polymerization was carried out under the same conditions as in Example 1. The results obtained are as set forth in Table 2.

Example 5

A solid catalyst was prepared in the same way as in Example 1 except that alumina V shown in Table 1 was used in place of silica I in the same table. Then, using the solid catalyst, a vapor phase polymerization was carried out under the same conditions as in Example 1. The results obtained are as set forth in Table 2.

Example 6

A solid catalyst was prepared in the same way as in Example 1 except that silica-alumina VI shown in Table 1 was used in place of silica I in the same table. Then, using the solid catalyst, a vapor phase polymerization was carried out under the same conditions as in Example 1. The results obtained are as set forth in Table 2.

Comparative Example 1

A solid catalyst was prepared in the same way as in Example 1 except that silica VII shown in Table 1 was used as an alternative to silica I in the same table. Then, using the solid catalyst, a vapor phase polymerization was performed under the same conditions as in Example 1. The results obtained are as set forth in Table 2.

Catalytic efficiency and bulk density were lower than in Examples 1 to 6.

Comparative Example 2

A solid catalyst was prepared in the same way as in Example 1 except that silica VIII shown in Table 1 was used as an alternative to silica I in the same table. Then, using the solid catalyst, a vapor phase polymerization was performed under the same conditions as in Example 1. The results obtained are as set forth in Table 2.

In comparison with Examples 1 to 6, catalytic efficiency and bulk density were lower and the particles obtained were fine in diameter and indefinite in shape.

Comparative Example 3

A solid catalyst was prepared in the same way as in Example 1 except that silica IX shown in Table 1 was used as an alternative to silica I in the same table. Then, using the solid catalyst, a vapor phase polymerization was performed under the same conditions as in Example 1. The results obtained are as set forth in Table 2.

In comparison with Examples 1 to 6, catalytic efficiency and bulk density were lower and the particles obtained were fine in diameter and indefinite in shape.

Example 7

(1) Preparation of Solid Catalyst 100 ml of purified toluene 2.6 g of zirconium tetrabutoxide and 6.5 g of indene were fed into a three-necked 300 ml flask equipped with an electromagnetic induction stirrer, and stirring was performed at room temperature for 1 hour. After subsequent cooling to −60° C., 18.5 ml of trihexylaluminum was added over a period of 20 minutes. Thereafter, stirring was continued at −60° C. for 1 hour and then the temperature was raised gradually to 20° C. with stirring over a 2 hour period. Further, stirring was conducted at 45° C. for 3 hours to afford a solution of black color (component A).

100 ml of purified n-butanol and then 30 g of silica I shown in Table I were charged into a three-necked 300 ml flask equipped with an electromagnetic induction stirrer, and reaction was allowed to take place under reflux of the n-butanol for 2 hours. Thereafter, the n-butanol was distilled off, followed by vacuum drying at 120° C. to give particles having fluidity (component B).

10 g of the component B prepared above was placed in a three-necked 300 ml flask equipped with an electromagnetic induction stirrer, and then 42 ml of a methylaluminoxane solution in toluene (2.5 mmol/ml) was added, allowing reaction to take place at room temperature for 16 hours. Next, 20 ml of the solution in toluene of component A prepared above was added and stirring was conducted at room temperature for 2 hours. Subsequently, the solvent was removed by blowing of nitrogen to yield a solid catalyst superior in fluidity.

(2) Vapor Phase Polymerization

A vapor phase polymerization was carried out using the same apparatus as in Example 1. Into the autoclave held at 60° C. were fed ethylene and butene-1 gases while adjusting the butene-1/ethylene mol ratio in the autoclave to 0.05. The gases in the system were circulated by the blower while maintaining the total pressure at 8 kg/cm$^2$G, and the solid catalyst prepared above was fed at a rate of 100 mg/hr. In this condition, polymerization was performed continuously for 10 hours while withdrawing the resulting polymer intermittently. The results obtained are as set out in Table 2.

Example 8

A solid catalyst was prepared in the same manner as in Example 7 except that silica II shown in Table 1 was substituted for silica I in the same table. Using the solid catalyst, a vapor phase polymerization was performed under the same conditions as in Example 7. The results obtained are as set forth in Table 2.

Comparative Example 4

A solid catalyst was prepared in the same manner as in Example 7 except that silica VII shown in Table 1 was substituted for silica I in the same table. Using the solid catalyst, a vapor phase polymerization was performed under the same conditions as in Example 7. The results obtained are as set forth in Table 2.

Example 9

(1) Preparation of Solid Catalyst 150 ml of purified toluene 3.8 g of zirconium tetrabutoxide (Zr(OBu)$_4$) and 9.3 g of indene were fed in a nitrogen atmosphere into a three-necked 300 ml flask equipped with an electromagnetic induction stirrer. After stirring at room temperature for 30 minutes, 22.8 g of trihexylaluminum was added dropwise, and thereafter, stirring was conducted at room temperature for 5 hours. The concentration of the resulting solution was 0.054 mmol/ml.

100 ml of purified toluene 7.5 ml of the solution prepared above and 16 ml of a methylaluminoxane solution in toluene (concentration: 2.5 mmol/ml) were charged in a nitrogen atmosphere into a three-necked 300 ml flask equipped with an electromagnetic induction stirrer, and stirring was conducted at room temperature for 2 hours.

Next, 10 g of silica I shown in Table 1, which had been calcined at 600° C. for 5 hours was added and stirring was performed at room temperature for 2 hours, followed by blowing of nitrogen and subsequent drying under reduced pressure at 400° C. for 1 hour to afford a solid catalyst superior in fluidity.

(2) Vapor Phase Polymerization

A vapor phase polymerization was carried out under the same apparatus as in Example 1. Into the autoclave held at 75° C. were fed ethylene and butene-1 gases while adjusting the butene-1/ethylene mol ratio in the autoclave to 0.09. The gases in the system were circulated by the blower while maintaining the total pressure at 8 kg/cm$^2$G, and the solid catalyst prepared above was fed at a rate of 100 mg/hr. In this condition, polymerization was performed continuously for 10 hours while withdrawing the resulting polymer intermittently. The results obtained are as shown in Table 2.

Example 10

A catalyst was prepared in the same manner as in Example 9 except that the amount of methylaluminoxane used was increased twice as much. That is 150 ml of purified toluene 3.8 g of zirconium tetrabutoxide (Zr(OBu)$_4$) and 9.3 g of indene were fed in a nitrogen atmosphere into a three-necked 300 ml flask equipped with an electromagnetic induction stirrer, and stirring was performed at room temperature for 30 minutes. Thereafter, 22.8 g of trihexylaluminum was added dropwise over a 30 minutes period, followed by stirring at room temperature for 5 hours. The concentration of the resulting solution was 0.054 mmol/ml as Zr.

100 ml of purified toluene 7.5 ml of the solution prepared above and 32 ml of a methylaluminoxane solution in toluene (concentration: 2.5 mmol/ml) were charged in a nitrogen atmosphere into a three-necked 300 ml flask equipped with an electromagnetic induction stirrer, and stirring was conducted at room temperature for 2 hours.

Next, 10 g of silica I shown in Table 1, which had been calcined at 600° C. for 5 hours was added and stirring was performed at room temperature for 2 hours, followed by blowing of nitrogen, at 40° C. for 1 hour and subsequent drying under reduced pressure at 40° C. for 1 hour to afford particles superior in fluidity. The particles were then subjected to classification using a 350 µm sieve in a nitrogen atmosphere to find that there remained no particles on the sieve.

(2) Vapor Phase Polymerization

A vapor phase polymerization was carried out under the same conditions as in Example 9. The results obtained are as shown in Table 2.

Example 11

A solid catalyst was prepared in the same manner as in Example 9 except that silica II shown in Table 1 was substituted for silica I in the same table. Then, using the solid catalyst, a vapor phase polymerization was performed under the same conditions as in Example 9. The results obtained are as set forth in Table 2.

Comparative Example 5

A solid catalyst was prepared in the same manner as in Example 9 with the exception that silica VII shown in Table 1 was used as an alternative to silica I in the same table. Then, using the solid catalyst, a vapor phase polymerization was ccrried out under the same conditions as in Example 9. The results obtained are as set forth in Table 2.

Catalytic efficiency and bulk density were lower than in Examples 9 and 11.

Comparative Example 6

A solid catalyst was prepared in the same manner as in Example 10 with the exception that silica VII shown in Table 1 was used as an alternative to silica I in the same table. When toluene was removed to give a solid catalyst, a portion of the catalyst was agglomerated. As a result of classification using a 350 μm sieve in a nitrogen atmosphere, 20 wt% particles were recovered on the sieve, a vapor phase polymerization was performed under the same conditions as in Example 10, catalytic efficiency and bulk density were lower and the polymer shape was indefinite.

Example 12

(1) Preparation of Solid Catalyst 150 ml of purified toluene 3.8 g of zirconium tetrabutoxide ($Zr(OBu)_4$) and 3.8 g of 3-dimethylcyclopentadiene were fed in a nitrogen atmosphere into a three-necked 300 ml flask equipped with an electromagnetic induction stirrer, and stirring was conducted at room temperature for 30 minutes. Thereafter, 15.8 g of triisobutylaluminum was added dropwise over a 30 minutes period, followed by stirring at room temperature for 5 hours. The concentration of the resulting solution was 0.058 mmol/ml as Zr.

100 ml of purified toluene 8.7 ml of the solution prepared above and 20 ml of a methylaluminoxane solution in toluene (concentration: 2.5 mmol/ml) were charged in a nitrogen atmosphere into a three-necked 300 ml flask equipped with an electromagnetic induction stirrer, and stirring was conducted at room temperature for 2 hours.

Next, 10 g of silica I shown in Table 1, which had been calcined at 600° C. for 5 hours was added and stirring was performed at room temperature for 2 hours, followed by blowing of nitrogen for 1 hour and subsequent drying at 40° C. under reduced pressure for 1 hour, to afford a solid catalyst superior in fluidity.

(2) Vapor Phase Polymerization

A vapor phase polymerization was carried out under the same apparatus as in Example 1. Into the autoclave held at 75° C. were fed ethylene, butene-1 and hydrogen gases while adjusting the butene-1/ethylene mol ratio in the autoclave to 0.07 and the hydrogen concentration to 600 ppm. The gases in the system were circulated by the blower while maintaining the total pressure at 8 kg/cm²G, and the solid catalyst prepared above was fed at a rate of 100 mg/hr. In this condition, polymerization was conducted continuously for 10 hours while withdrawing the resulting polymer intermittently. The results obtained are as listed in Table 2.

Example 13

A solid catalyst was prepared in the same manner as in Example 12 except that silica II shown in Table 1 was used as an alternative to silica I in the same table. Then, using the solid catalyst, a vapor phase polymerization was carried out under the same conditions as in Example 12. The results obtained are as listed in Table 2.

Comparative Example 7

A solid catalyst was prepared in the same manner as in Example 12 with the exception that silica VII shown in Table 1 was used in place of silica I in the same table. Then, using the solid catalyst, a vapor phase polymerization was carried out under the same conditions as in Example 12. The results obtained are as set forth in Table 2.

Catalytic efficiency and bulk density were lower than in Examples 12 and 13.

Example 14

(1) Preparation of Solid Catalyst 100 ml of purified toluene 5.84 g of triethylaluminum and 2.2 g of indene were fed into a three-necked 300 ml flask equipped with an electromagnetic induction stirrer, followed by cooling to –60° C. Into the resulting solution was added over a 20 minutes period a solution which had separately been prepared by charging a 100 ml flask with 50 ml of toluene, 4.2 g of zirconium tetrapropoxide ($Zr(OPr)_4$) and 0.8 g of indene. Thereafter, stirring was continued at –60° C. for 1 hour and then the temperature was raised gradually with stirring up to 20° C. over a 2 hour period. Further, the stirring was continued at 45° C. for 3 hours to give a solution of black color. The concentration of this black solution was 0.075 mmol/ml as Zr. (component A)

Into a three-necked 300 ml flask equipped with an electromagnetic induction stirrer was added 100 ml of purified toluene, then 10 g of silica I shown in Table 1 was added, and further added was 6.0 ml of a methylaluminoxane solution in toluene (concentration: 2.5 mmol/ml), then stirring was performed at room temperature for 2 hours, followed by blowing of nitrogen for drying, to afford particles superior in fluidity. (component B)

10 g of the carrier component prepared above was component B was placed in a nitrogen atmosphere into a three-necked 300 ml flask equipped with an electromagnetic induction stirrer, then 30 ml of the toluene solution prepared above as component A was added, and further added and was 15 ml of purified toluene. After stirring at room temperature for 2 hours, the solvent was removed by blowing of nitrogen under reduced pressure, leaving a solid catalyst superior in fluidity.

(2) Vapor Phase Polymerization

A vapor phase polymerization was carried out using the same apparatus as in Example 1. A solid catalyst prepared above and methylaluminoxane solution in toluene (1 mmol/ml) were fed at rates of 100 mg/hr and 11 mmol/hr, respectively, into the autoclave held at 60° C. Further, butene-1 and ethylene gases were fed while adjusting the butene-1/ethylene mol ratio in the autoclave to 0.25, and the gases in the system were circulated by the blower while maintaining the total pressure at 8 kg/cm²G. In this condition, polymerization was performed continuously for 10 hours while withdrawing the resulting polymer intermittently. The results obtained are as set forth in Table 2.

Example 15

A solid catalyst was prepared in the same manner as in Example 14 with the exception that silica II shown in Table 1 was used in place of silica I in the same table. Then, using the solid catalyst, a vapor phase polymerization was carried out under the same conditions as in Example 14. The results obtained are as shown in Table 2.

Comparative Example 8

A solid catalyst was prepared in the same manner as in Example 14 with the exception that silica VII shown in Table 1 was used in place of silica I in the same table. Then, using the solid catalyst, a vapor phase polymerization was carried out under the same conditions as in Example 14. The results obtained are as shown in Table 2.

Catalytic efficiency and bulk density were low comparison with Examples 14 and 15.

TABLE 1

Properties of Metal Oxides

| No. | Kind | (A) Average Particle Diameter μm | (B) Surface Area $m^2/g$ | (C) Pore Volume PV-I $cm^3/g$ | (D) PV-II/PV-I | Ultra-Apparent Specific Gravity $g/cm^2$ | (E) Degree of sonic Disintegration % |
|---|---|---|---|---|---|---|---|
| I | Silica | 54 | 240 | 1.25 | 0.70 | 0.38 | 10 |
| II | Silica | 47 | 260 | 1.30 | 0.65 | 0.36 | 12 |
| III | Silica | 64 | 210 | 1.20 | 0.60 | 0.37 | 9 |
| IV | Silica | 57 | 220 | 1.40 | 0.85 | 0.33 | 19 |
| V | Alumina | 62 | 230 | 0.80 | 0.55 | 0.39 | 5 |
| VI | Silica-Alumina | 62 | 400 | 0.95 | 0.60 | 0.39 | 4 |
| VII | Silica | 52 | 290 | 0.95 | 0.35 | 0.40 | 5 |
| VIII | Silica | 55 | 250 | 1.35 | 0.70 | 0.37 | 40 |
| IX | Silica | 50 | 210 | 1.42 | 0.85 | 0.29 | 53 |

What is claimed is:

1. A solid catalyst for olefin polymerization, characterized in that said solid catalyst is prepared by contacting the following components (1) to (5) with one another:

(1) a compound represented by the general formula $Me^1R^1_p(OR^2)_qX^1_{4-p-q}$, where $Me^1$ is Zr, Ti or Hf, $R^1$ and $R^2$ are each independently a hydrocarbon group having 1 to 24 carbon atoms, $X^1$ is a halogen atom, p and q are each an integer falling under the ranges of $0 \leq p < 4$ or $0 \leq q < 4$, provided $0 \leq p+q \leq 4$;

(2) a compound represented by the general formula $Me^2R^3_m(OR^4)_nX^2_{z-m-n}$, where, where $Me^2$ is a Group I–III element of the Periodic Table, $R^3$ and $R^4$ are each independently a hydrocarbon group having 1 to 24 carbon atoms, $X^2$ is a halogen atom or a hydrogen atom, provided when $X^2$ is a hydrogen atom, $Me^2$ is a Group III element in the Periodic Table, z is the valence of $Me^2$, m and n are each an integer falling under the ranges of $0 < m < z$ or $0 \leq n \leq z$ provided $0 \leq m+n \leq z$;

(3) an organocyclic compound having conjugated double bonds in the ring;

(4) a modified organoaluminum compound having Al—O—Al bond(s); and (5) a silicon oxide and/or an aluminum oxide both satisfying the following characteristics (A) to (E):

(A) An average particle diameter as measured by the sieving method is in the range of 20 to 150 μm;

TABLE 2

Results of the Vapor Phase Polymerization

| Ex. No. Com. Ex. No. | Metal Oxide No. | Catalytic Efficiency g. polymer/ g. Zr | Bulk Density $g/cm^3$ | MFR g/10 min | Density $g/cm^3$ | Melting Point °C. | Average Particle Diameter μm | Particle Shape |
|---|---|---|---|---|---|---|---|---|
| Ex. 1 | I | 162,000 | 0.49 | 1.62 | 0.9201 | 113.2 | 670 | round |
| Ex. 2 | II | 156,000 | 0.49 | 1.82 | 0.9205 | 113.7 | 650 | round |
| Ex. 3 | III | 143,000 | 0.47 | 2.25 | 0.9203 | 114.6 | 640 | round |
| Ex. 4 | IV | 158,000 | 0.48 | 1.42 | 0.9211 | 114.3 | 660 | round |
| Ex. 5 | V | 138,000 | 0.47 | 1.25 | 0.9216 | 115.8 | 630 | round |
| Ex. 6 | VI | 141,000 | 0.47 | 1.31 | 0.9211 | 116.0 | 630 | round |
| Com. Ex. 1 | VII | 95,000 | 0.44 | 2.08 | 0.9208 | 114.4 | 550 | round |
| Com. Ex. 2 | VIII | 119,000 | 0.34 | 1.85 | 0.9213 | 113.6 | 500 | indefined |
| Com. Ex. 3 | IX | 125,000 | 0.29 | 1.73 | 0.9209 | 113.5 | 450 | indefined |
| Ex. 7 | I | 172,000 | 0.49 | 1.15 | 0.9211 | 113.3 | 680 | round |
| Ex. 8 | II | 159,000 | 0.49 | 1.22 | 0.9215 | 113.8 | 660 | round |
| Com. Ex. 4 | VII | 125,000 | 0.47 | 0.97 | 0.9208 | 113.5 | 610 | round |
| Ex. 9 | I | 181,000 | 0.50 | 1.41 | 0.9196 | 113.4 | 690 | round |
| Ex. 10 | I | 326,000 | 0.48 | 1.33 | 0.9198 | 112.5 | 840 | round |
| Ex. 11 | II | 177,000 | 0.49 | 1.16 | 0.9204 | 113.7 | 670 | round |
| Com. Ex. 5 | VII | 139,000 | 0.46 | 1.11 | 0.9205 | 113.9 | 630 | round |
| Com. Ex. 6 | VII | 185,000 | 0.42 | 1.44 | 0.9207 | 114.6 | 700 | indefined |
| Ex. 12 | I | 146,000 | 0.48 | 0.92 | 0.9196 | 112.0 | 640 | round |
| Ex. 13 | II | 142,000 | 0.47 | 0.98 | 0.9195 | 111.8 | 640 | round |
| Com. Ex. 7 | VII | 98,000 | 0.45 | 0.84 | 0.9198 | 112.0 | 560 | round |
| Ex. 14 | I | 120,000 | 0.49 | 1.06 | 0.9204 | 113.5 | 610 | round |
| Ex. 15 | II | 115,000 | 0.48 | 0.96 | 0.9203 | 113.9 | 600 | round |
| Com. Ex. 8 | VII | 80,000 | 0.45 | 1.00 | 0.9210 | 114.1 | 560 | round |

(B) A specific surface area as measured by the BET method is in the range of 150 to 600 m²/g;

(C) The volume of pores ranging in pore radius from 18 to 1,000 Angstroms as measured by the mercury penetration method is in the range of 0.3 to 2.0 cm³/g, and the ratio of the volume of pores ranging in pore radius from 50 to 500 Å to the volume of pores ranging in pore radius from 18 to 1,000 Å is not less than 50%;

(D) An apparent specific gravity as measured according to JIS K6220-6.8 is not lower than 0.32;

(E) After any particles classified in the range of 53 to 75 μm by the sieving method have been subjected to an ultrasonic disintegration treatment in water at 40 KHz, 35W, for 20 minutes, the proportion of 50 μm or smaller particles, (the degree of ultrasonic disintegration), is not more than 30%.

2. A catalyst as set forth in claim 1, wherein the component (5) satisfies the following characteristics (A) to (E):

(A) An average particle diameter as measured by the sieving method is in the range of 25 to 100 μm;

(B) A specific surface area as measured by the BET method is in the range of 200 to 500 m²/g;

(C) The volume of pores ranging in pore radius from 18 to 1,000 Angstroms as measured by the mercury penetration method is in the range of 0.6 to 1.8 cm³/g, and the ratio of the volume of pores ranging in pore radius from 50 to 500 Å to the volume of pores ranging in pore radius from 18 to 1,000 Å is not less than 60%;

(D) An apparent specific gravity as measured according to JIS K6220-6.8 is not lower than 0.35;

(E) After any particles classified in the range of 53 to 75 μm by the sieving method have been subjected to an ultrasonic disintegration treatment in water at 40 KHz, 35W, for 20 minutes, the proportion of 50 μm or smaller particles, (the degree of ultrasonic disintegration), is not more than 20%.

3. A catalyst as set forth in claim 1, wherein $Me^2$ in the component (2) is lithium, sodium, potassium, magnesium, calcium, zinc, boron or aluminum.

4. A catalyst as set forth in claim 1, wherein the component (3) is a cyclic hydrocarbon having at least one ring which contains 2 to 4 conjugated double bonds and having 5 to 24 carbon atoms in all.

5. A catalyst as set forth in claim 4, wherein the cyclic hydrocarbon is a compound represented by the following general formula:

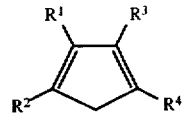

Where $R^1$, $R^2$, $R^3$ and $R^4$ are each independently a hydrogen or hydrocarbon group, two of which may conjointly form a cyclic hydrocarbon group.

6. A catalyst as set forth in claim 1, wherein the conponent (3) is a compound represented by the following general formula:

$$A_L SiR_{4-L}$$

where A is a cyclic hydrocarbon group, R is hydrogen or a halocarbon residue having 1 to 24 carbon atoms, and L is an integer in the range of $1 \leq L \leq 4$.

7. A catalyst as set forth in claim 1, wherein the component (4) is a compound having 1 to 100 Al—O—Al bonds in the molecule thereof prepared by the reaction of an organoaluminum compound and water.

8. A catalyst as set forth in claim 1, wherein the proportion ratio of the component (2) to 1 mole of the component (1) is in the range of 0.01 to 100 moles.

9. A catalyst as set forth in claim 1, wherein the proportion ratio of the component (3) to 1 mole of the component (1) is in the range of 0.01 to 100 moles.

10. A catalyst as set forth in claim 1, wherein the proportion ratio of the component (4) to 1 mole of the component (1) is in the range of 1 to 100,000 moles.

11. A catalyst as set forth in claim 1, wherein the proportion ratio of the transition metal in component (1) to 1 g of the component (5) is in the range of 0.001 to 50 mmol.

12. A process for preparing a polyolefin which comprises homopolymerizing or copolymerizing one or more olefins in the presence of the catalyst as defined in claim 1.

* * * * *